(12) United States Patent
Palin et al.

(10) Patent No.: US 7,454,171 B2
(45) Date of Patent: Nov. 18, 2008

(54) METHOD AND SYSTEM FOR VOIP OVER WLAN TO BLUETOOTH HEADSET USING ACL LINK AND SNIFF FOR ALIGNED ESCO TRANSMISSION

(75) Inventors: Arto Palin, Viiala (FI); Mauri Honkanen, Tampere (FI); Jukka Reunamäki, Tampere (FI)

(73) Assignee: Nokia Corporation, Espoo (FI)

(*) Notice: Subject to any disclaimer, the term of this patent is extended or adjusted under 35 U.S.C. 154(b) by 590 days.

(21) Appl. No.: 11/065,613

(22) Filed: Feb. 25, 2005

(65) Prior Publication Data

US 2006/0194538 A1 Aug. 31, 2006

(51) Int. Cl.
H04B 7/00 (2006.01)

(52) U.S. Cl. .................. 455/41.2; 455/512; 455/513; 455/552.1; 455/553.1; 370/328; 370/338; 370/444; 370/455

(58) Field of Classification Search .............. 455/512, 455/41.2, 513, 552.1, 553.1; 370/338, 444, 370/455, 328
See application file for complete search history.

(56) References Cited

U.S. PATENT DOCUMENTS

| | | |
|---|---|---|
| 6,259,898 B1 | 7/2001 | Lewis |
| 6,326,926 B1 | 12/2001 | Shoobridge et al. |
| 6,377,608 B1 | 4/2002 | Zyren |
| 6,452,910 B1 | 9/2002 | Vij et al. |
| 2002/0132632 A1 | 9/2002 | Brassil et al. |
| 2002/0136184 A1 | 9/2002 | Liang et al. |
| 2004/0071123 A1 | 4/2004 | Shin |
| 2004/0203367 A1 | 10/2004 | Nowlin |
| 2005/0215284 A1 | 9/2005 | Su et al. |

FOREIGN PATENT DOCUMENTS

| | | |
|---|---|---|
| EP | 1119137 | 7/2001 |
| EP | 1148677 | 10/2001 |
| EP | 1176731 | 1/2002 |
| EP | 1294048 | 3/2002 |
| EP | 1199842 | 4/2002 |
| EP | 1207654 | 5/2002 |

(Continued)

OTHER PUBLICATIONS

"Coexistence of Wireless Personal Area Networks with Other Wireless Devices Operating in Unlicensed Frequency Bands", IEEE Standards 802 Part 15.2, Aug. 28, 2003, pp. 1-115.
U.S. Appl. No. 11/360,004, filed Feb. 23, 2006, Arto Palin et al.

Primary Examiner—Tuan Pham
(74) Attorney, Agent, or Firm—Morgan & Finnegan LLP

(57) ABSTRACT

The invention solves the problem of reducing interference in simultaneous wireless LAN (WLAN) and Bluetooth signal handling, especially in voice over IP communications via a WLAN telephone to a Bluetooth headset. The invention sets up a voice link between the terminal and the headset by establishing sniff anchor points in the ACL link for assigning relative priorities to the WLAN and Bluetooth ACL packet traffic. A higher priority is assigned to WLAN packet traffic when it collides with original Bluetooth ACL packet traffic during a sniff anchor point. Thereafter, a higher priority is assigned to the terminal's retransmission of aborted Bluetooth ACL packets and the headset's response ACL packets in available Bluetooth slots following the anchor point.

36 Claims, 11 Drawing Sheets

FOREIGN PATENT DOCUMENTS

| | | |
|---|---|---|
| EP | 1359779 | 11/2003 |
| EP | 1404071 | 3/2004 |
| EP | 1404072 | 3/2004 |
| EP | 1463241 | 9/2004 |
| EP | 1489788 A2 | 12/2004 |
| WO | WO 01/24454 | 4/2001 |
| WO | WO 01/24455 | 4/2001 |
| WO | WO 01/24456 | 4/2001 |
| WO | WO 01/24457 | 4/2001 |
| WO | WO 01/24458 | 4/2001 |
| WO | WO 01/35540 | 5/2001 |
| WO | WO 01/35578 | 5/2001 |
| WO | WO 01/84789 | 11/2001 |
| WO | WO 02/19743 | 3/2002 |
| WO | WO 02/30022 A2 | 4/2002 |
| WO | WO 02/73430 | 9/2002 |
| WO | WO 03/096617 A2 | 11/2003 |
| WO | WO 2004/023746 | 3/2004 |
| WO | WO 2004/023747 | 3/2004 |
| WO | WO 2004/027565 | 4/2004 |
| WO | WO 2004/045082 | 5/2004 |
| WO | WO 2004/045092 | 5/2004 |
| WO | WO 2004/079998 | 9/2004 |
| WO | WO 2004/079999 | 9/2004 |
| WO | WO 2004/082311 | 9/2004 |

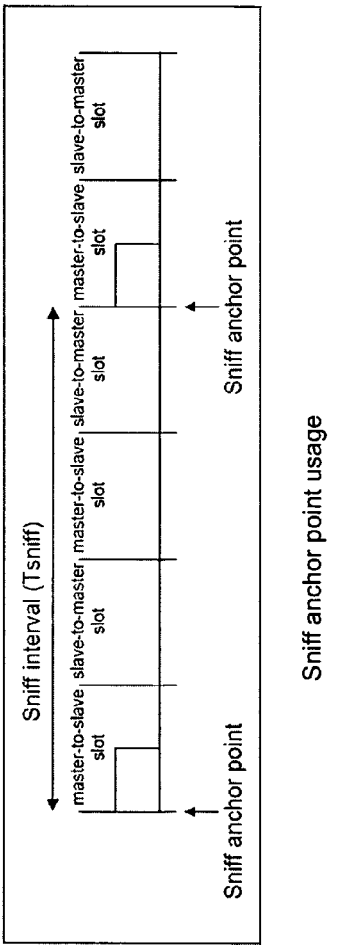
FIG. 3
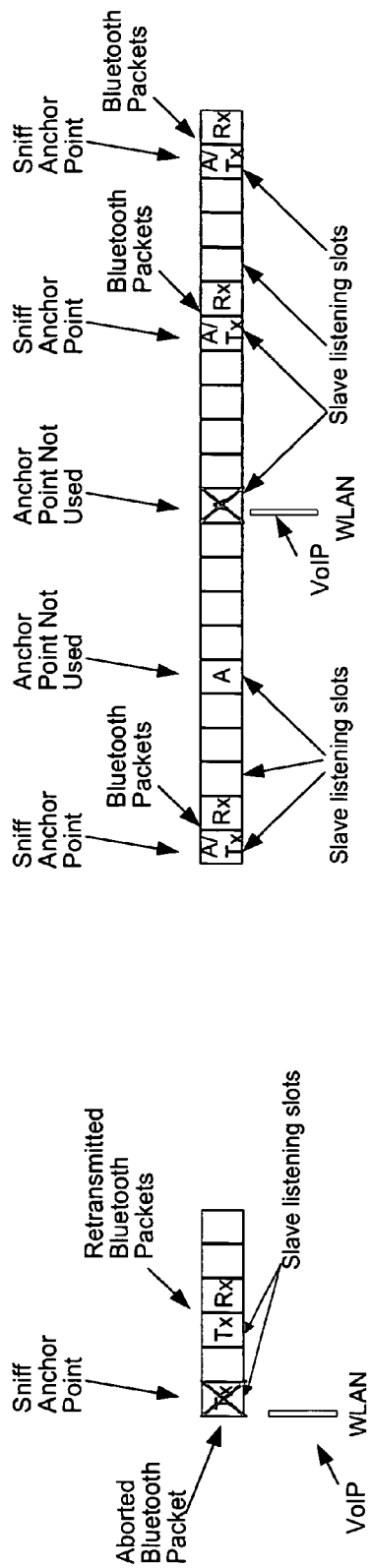
FIG. 5
FIG. 4

HEADSET'S STATE DIAGRAM 860

METHOD AND SYSTEM FOR VOIP OVER WLAN TO BLUETOOTH HEADSET USING ACL LINK AND SNIFF FOR ALIGNED ESCO TRANSMISSION

FIELD OF THE INVENTION

The invention disclosed broadly relates to improvements in mobile wireless terminals having more than one short-range communication interface, for reducing interference in simultaneous signal handling. The invention more particularly relates to reducing interference in voice over IP (VoIP) communications in wireless terminals having both wireless local area network (WLAN) and Bluetooth interface.

BACKGROUND OF THE INVENTION

The best-known example of wireless personal area network (PAN) technology is the Bluetooth Standard, which operates in the 2.4 GHz ISM band. Bluetooth is a short-range radio network, originally intended as a cable replacement. Bluetooth devices are designed to find other Bluetooth devices and Bluetooth access points within their roughly ten meter radio communications range. Bluetooth is a time division multiplexed (TDM) system, where the basic unit is a slot of 625 microsecond duration. Each Bluetooth device may be either a master or a slave at any one time, but not simultaneously in the same piconet. The master device initiates an exchange of data by sending a packet in a slot and the slave device must respond to the master with a packet in the next slot indicating whether it successfully received the prior packet. The slave will not transmit again until the master again transmits to it. The Bluetooth Special Interest Group, *Bluetooth Specification Including Core Volume* 1.2, Nov. 5, 2003, (hereinafter "Bluetooth v1.2 Specification") describes the principles of Bluetooth device operation and communication protocols. The Bluetooth v1.2 Specification is available from the Bluetooth Special Interest Group at the web site www.bluetooth.com.

A recent specification published by the Bluetooth Special Interest Group, *Specification of the Bluetooth System, Volume* 2.0+EDR, Nov. 4, 2004, (hereinafter "Bluetooth v2+EDR Specification") describes the Enhanced Data Rate (EDR) Bluetooth, which permits speeds up to 2.1 Mbps, while maintaining backward compatibility. The Bluetooth v2+EDR Specification is available from the Bluetooth Special Interest Group at the web site www.bluetooth.com.

One application of the Bluetooth technology is to carry audio information, which enables designing devices such as wireless headsets. Audio data is carried via Synchronous Connection-Oriented (SCO) packets using coding schemes such as Continuously Variable Slope Delta (CVSD) modulation or a Pulse Code Modulation (PCM). When a SCO link is established, the packets are exchanged over the air between the master and a slave device by alternately transmitting and receiving the encoded audio data in consecutive SCO slots. An example of a Bluetooth wireless headset and a Bluetooth-enabled telephone terminal is shown in FIG. 1. The telephone terminal 100A includes a Bluetooth transceiver module 604 connected to the Bluetooth antenna 102A. The wireless headset 101A also includes a Bluetooth transceiver module connected to its own Bluetooth antenna. Either the headset or the telephone terminal can initially assume the role of the master device, depending on how the connection was initiated. When a SCO link 106A is established between the telephone terminal 100A and the wireless headset 101A, packets are exchanged over the air between the master and slave device by alternately transmitting and receiving the encoded audio data in consecutive SCO slots.

Wireless local area networks (WLAN) cover a larger radio communications range of up to one hundred meters. Examples of wireless local area network technology include the IEEE 802.11 Wireless LAN Standard. The 802.11b standard for wireless local area networks (WLANs), also called Wi-Fi, is part of the 802.11 series of WLAN standards from the Institute of Electrical and Electronics Engineers (IEEE). Networks employing 802.11b operate at radio frequencies in the 2.4 GHz ISM band, the same as that for Bluetooth. Like other 802.11 standards, 802.11b uses the Ethernet protocol and CSMA/CA (carrier sense multiple access with collision avoidance) for path sharing. The modulation method used in 802.11b is complementary code keying (CCK), which allows higher data speeds and is less susceptible to multipath-propagation interference. An example of a WLAN is shown in FIG. 1, where the telephone terminal 100A is a mobile device, which includes an IEEE 802.11b transceiver 602 connected to a WLAN antenna 103A. The WLAN access point 140A shown at location A in FIG. 1 also has an IEEE 802.11b transceiver connected to its own WLAN antenna. When an RF communications link 108A conforming to the IEEE 802.11b Standard is established between the telephone terminal 100A and the access point 140A, data frames containing encoded audio data are exchanged over the WLAN coverage area 150A between the telephone terminal 100A and the access point 140A. The access point 140A is shown connected by wireline to the IP Network 144, to exchange data frames containing voice over internet (VoIP) encoded audio data in a IP network.

FIG. 1 shows a second WLAN access point 140B shown at location B in FIG. 1 connected by wireline to the IP Network 144, establishing a second WLAN coverage area 150B. The WLAN access point 140B has an IEEE 802.11b transceiver connected to its own WLAN antenna. The second WLAN access point 140B communicates with a second telephone terminal 100B, which includes an IEEE 802.11b transceiver connected to a WLAN antenna 103B. When an RF communications link 108B conforming to the IEEE 802.11b Standard is established between the telephone terminal 100B and the access point 140B, data frames containing voice over internet (VoIP) encoded audio data are exchanged over the WLAN coverage area 150B between the telephone terminal 100B and the access point 140B. The telephone terminal 100B includes a Bluetooth transceiver module connected to the Bluetooth antenna 102B. The wireless headset 101B also includes a Bluetooth transceiver module connected to its own Bluetooth antenna. Either the headset or the telephone terminal can initially assume the role of the master device, depending on how the connection was initiated. When a SCO link 106B is established between the telephone terminal 100B and the wireless headset 101B, packets are exchanged over the air between the master and slave device by alternately transmitting and receiving the encoded audio data in consecutive SCO slots. In this manner, voice conversations can be established between users of the wireless headsets 101A and 101B.

The 802.11g specification is another standard for wireless local area networks (WLANs) that offers transmission over relatively short distances at up to 54 megabits per second (Mbps), compared to the 11 Mbps theoretical maximum with the earlier 802.11b standard. Networks employing 802.11g operate at radio frequencies in the 2.4 GHz ISM band, the same band as for Bluetooth and for 802.11b. But, the 802.11g specification employs orthogonal frequency division multiplexing (OFDM) to obtain higher data speed than that for 802.11b. Computers or terminals set up for 802.11g can fall back to speeds of 11 Mbps. This feature makes 802.11b and 802.11g devices compatible within a single network. The IEEE 802.11 Wireless LAN Standard is available from the IEEE, Inc. web site http://grouper.ieee.org/groups/802/11.

Combining the short range PAN (e.g., Bluetooth) and the longer range WLAN (e.g., IEEE 802.11g) features in a unitary, mobile terminal enables a user to tap into area-wide WLAN access points and to operate local I/O devices without a cable connection. An example of such a mobile terminal is the wireless telephone 100A of FIG. 1 that includes both a Bluetooth transceiver and a WLAN transceiver, enabling the user to receive a voice over internet (VoIP) telephone call from a WLAN access point 140A and to converse with the caller using the wireless headset 101A via the Bluetooth connection 106A between the headset and the telephone. A significant problem with a wireless telephone that includes both a Bluetooth transceiver and a WLAN transceiver is that the Wireless LAN and the Bluetooth networks both operate in the 2.4 GHz ISM band and therefore can interfere with each other.

The VoIP telephone call is established over Internet Protocol (IP) by using User Datagram Protocol (UDP) and Real Time Protocol (RTP). VoIP packets carry real time data in the Voice Payload. The standard for transmitting real time data in packet switched networks is ITU standard H.323, which uses RTP/UDP/IP encapsulation. Real-Time Transport Protocol (RTP) supports end-to-end delivery services of applications transmitting real-time data over IP networks. The RTP packet includes an RTP header and the Voice Payload. User Datagram Protocol (UDP) is a connectionless protocol that, like TCP, runs on top of IP networks. The UDP packet includes a UDP header and the RTP packet. UDP/IP offers a direct way to send and receive packets over an IP network. The IP packet includes an IP header, the UDP packet, and a CRC trailer field. The VoIP packet typically delivers 20 ms of speech and the size of the IP packet depends on the voice codec used in encoding the speech stream. The VoIP packet is sent to the mobile terminal 100A using the WLAN link 108A. In mobile terminal the VoIP packet is decoded and then re-encoded with a Bluetooth codec, which is a Continuously Variable Slope Delta (CVSD) modulation codec or a Pulse Code Modulation (PCM) codec described in the Bluetooth v1.2 Specification. In the receiving mode, the coded packet is delivered to the Bluetooth headset 101A and converted to voice. The sequence is reversed in the transmitting mode, although the processing capacity of the headset may limit applicable encoding schemes and hence also technical solutions to the interference problem.

The WLAN frame structure for the IEEE 802.11b standard carries the VoIP packet in the frame body field of the Medium Access Control (MAC) frame defined in the IEEE Standard. Each wireless station and access point in an IEEE 802.11 wireless LAN implements the MAC layer service, which provides the capability for wireless stations to exchange MAC frames. The MAC frame transmits management, control, or data between wireless stations and access points. After a station forms the applicable MAC frame, the frame's bits are passed to the transceiver for transmission. The WLAN data frame carrying a VoIP packet+ACK frame includes several additional components that give it an average duration of approximately 622 microseconds, which is approximately the same duration as a Bluetooth slot. The WLAN data frame begins with an interframe DIFS space of 50 microseconds, which ensures the previous transmission has completed and that it is safe to access the medium again. Next is a back-off wait interval averaging 80 microseconds to allow sharing the medium. Next is a 192 microsecond interval for the synchronization preamble. Next is the MAC frame payload of approximately 87 microseconds, which includes the VoIP packet. This is followed by the SIFS gap of ten microseconds between the data frame and its acknowledgement. This is followed by the WLAN acknowledgement (ACK) frame, which is 203 microseconds duration. The WLAN data frame is transmitted, on average, every twenty milliseconds in both the send and the receive directions.

Interoperability problems arise when WLAN transceivers and Bluetooth transceivers having their own separate antennas 102A and 103A are located in the same terminal 100A and have limited antenna isolation, as shown in FIG. 1. From an integration perspective, it is beneficial to utilize the same antenna and RF filter in a mobile terminal to reduce manufacturing cost and form factor, since both transceivers use the same 2.4 GHz band. In this case the access to the antenna for the WLAN and Bluetooth transceivers is arranged using a switch to connect one or the other of the transceivers to the antenna port at a time. An example of this is shown in FIG. 2 where the single antenna 105A of the terminal 100A is shared by both the Bluetooth transceiver and the WLAN transceiver. Similarly, the single antenna 105B of the terminal 100B is shared by both the Bluetooth transceiver and the WLAN transceiver. This arrangement requires that the Bluetooth and the WLAN transceivers in a terminal operate at different instants, requiring a coordinating control between the transceivers. Such a coordinating control must decide which transceiver can use the channel.

There are different requirements for the control, depending on whether the link is operating in real time for an interactive application, such as telephony, or whether the link is operating in a data transfer mode, such as file transfer protocol (FTP).

The WLAN access point is basically autonomous of the terminal, which has limited capabilities to affect downlink timing. Hence, the WLAN traffic cannot be reliably estimated by the terminal. Thus, when the access point is transmitting to the terminal, potentially many of the WLAN packets can be lost due simultaneous Bluetooth activity or a wrong switch position. To maintain speech integrity, retransmissions are required.

The Bluetooth v1.2 Specification defines different types of logical transports between the master and slave. Five logical transports have been defined:

1. Synchronous Connection-Oriented (SCO) logical transport, described above,

2. Extended Synchronous Connection-Oriented (eSCO) logical transport,

3. Asynchronous Connection-Less (ACL) logical transport,

4. Active Slave Broadcast (ASB) logical transport, and

5. Parked Slave Broadcast (PSB) logical transport.

The Synchronous Connection-Oriented (SCO) transports are point-to-point logical transports between a Bluetooth master and a single slave in the piconet. The synchronous logical transports typically support time-bounded information like voice or general synchronous data. The master maintains the synchronous logical transports by using reserved slots at regular intervals. Four packets are allowed on the SCO logical transport: HV1, HV2, HV3 and DV. The HV1 packet has 10 information bytes. The HV2 packet has 20 information bytes. The HV3 packet has 30 information bytes. The DV packet is a combined data and voice packet. On each SCO channel, n-bits are sent and received in consecutive SCO slots once every $T_{SCO}$ slots.

In addition to the reserved slots, the Extended Synchronous Connection-Oriented (eSCO) logical transport provides a retransmission window after the reserved slots. EV packets are used on the synchronous eSCO logical transport. The packets include retransmission if no acknowledgement of proper reception is received within allocated slots. eSCO packets may be routed to the synchronous I/O port. Three eSCO packets have been defined for Bluetooth. The EV3 packet has between 1 and 30 information bytes and may cover up to a single time slot. The EV4 packet has between 1 and 120 information bytes and may cover to up three time slots. The EV5 packet has between 1 and 180 information bytes and may cover up to three time slots. On each eSCO channel, n-bits are sent and received in consecutive eSCO slots once every period of $T_{eSCO}$ slots. Each packet header includes a one-bit acknowledge indication, ARQN, which indicates that the last prior packet was correctly received. With an automatic repeat request scheme, EV packets are retransmitted until acknowledgement of a successful reception is returned by the destination (or timeout is exceeded). As opposed to SCO links, eSCO links can be set up to provide limited retransmissions of lost or damaged packets inside a retransmission window of size $W_{eSCO}$ slots.

The Asynchronous Connection-Oriented (ACL) logical transport is also a point-to-point logical transport between the Bluetooth master and a slave. In the slots not reserved for SCO logical transport, the master can establish an ACL logical transport on a per-slot basis to any slave, including the slaves already engaged in a SCO logical transport. (Note that eSCO and SCO connections are optional and in some applications are not needed.) After a successful connection procedure, the devices are physically connected within a piconet. During the time that a slave device is actively connected to a piconet there is always a default ACL logical transport between the slave and the master device. The ACL logical transport uses error detecting and correcting coding. (Not all ACL packets use error detecting or correcting coding.) On ACL logical transports the results of the error detection are used for a simple acknowledgement/repeat request (ARQ) protocol to provide an enhanced reliability by retransmitting packets that do not pass the receiver's error checking algorithm.

The asynchronous connection-oriented (ACL) logical transport is used to carry best effort asynchronous user data that has no time-based characteristics and is normally expected to be retransmitted until successfully received. The ACL logical transport may also be used to transport isochronous data, such as audio or video data that has time-based characteristics. The isochronous data may be retransmitted until received or expired. The data rate on the isochronous link need not be constant, which is the main difference from synchronous links. The default ACL may be used for isochronous data transport by configuring it to automatically flush packets after the packets have expired.

After a successful connection procedure, the devices are in the active mode wherein both master and slave actively participate on the channel. The master schedules the transmission based on traffic demands to and from the slave and it supports regular transmissions to keep the slave synchronized to the channel. Slaves in the active mode listen in the master-to-slave slots for packets. The master can create and release additional logical links and to change the modes of the physical and logical links while remaining connected to the piconet physical channel. It is also possible for the device to carry out inquiry, paging or scanning procedures or to be connected to other piconets without needing to disconnect from the original piconet physical channel. Additional logical links are created using the Link Manager that exchanges Link Manager Protocol messages with the remote Bluetooth device to negotiate the creation and settings for these links.

The ACL logical transport link between a master and slave device can be changed from the active mode to the sniff mode, which is a common method for reducing power consumption in the slave device. When in the sniff mode the availability of the ACL logical transport is modified by defining a duty cycle consisting of periods of presence and absence. Slave devices that have their default ACL logical transports in the sniff mode may use the absent periods to enter reduced power mode. Sniff mode only affects the default ACL logical transports and does not apply to any additional SCO or eSCO logical transports that may be active between the slave and the master. In sniff mode, the duty cycle of the slave's activity in the piconet may be reduced. If a slave is in active mode on an ACL logical transport, it listens in every master-to-slave slot. With sniff mode, the time slots when a slave is listening are reduced, so the master only transmits to a slave in specified time slots called anchor points. The sniff anchor points are spaced regularly with an interval of $T_{sniff}$ as shown in FIG. 3. The slave listens in master-to-slave transmission slots starting at the sniff anchor point. It uses the following rules to determine whether to continue listening:

If fewer than $N_{sniff\ attempt}$ master-to-slave transmission slots have elapsed since the sniff anchor point then the slave continues listening.

If the slave has received a packet with a matching address that contains ACL data in the preceding $N_{sniff\ timeout}$ master-to-slave transmission slots then it continues listening.

If the slave has transmitted a packet containing ACL data in the preceding $N_{sniff\ timeout}$ slave-to-master transmission slots then it continues listening.

If the slave has received any packet with a matching address in the preceding $N_{sniff\ timeout}$ master-to-slave transmission slots then it may continue listening.

A device may override the rules above and stop listening prior to $N_{sniff\ timeout}$ or the remaining $N_{sniff\ attempt}$ slots if it has activity in another piconet.

Two parameters control the listening activity in the slave: the sniff attempt ($N_{sniff\ attempt}$) and the sniff timeout ($N_{sniff\ timeout}$). The sniff attempt parameter determines for how many slots the slave listens, beginning at the sniff anchor point slot, even if it does not receive a packet with its own address. The sniff timeout parameter determines for how many additional slots the slave listens, if it continues to receive only packets with its own address. It is not possible to modify the sniff parameters while the device is in sniff mode. Either the master or the slave may request entry to sniff mode.

It is possible that activity from one sniff timeout may extend to the next sniff anchor point. Any activity from a previous sniff timeout does not affect activity after the next sniff anchor point. So in the above rules, only the slots since the last sniff anchor point are considered.

The sniff mode only applies to asynchronous logical transports. Sniff mode does not apply to the SCO and eSCO synchronous logical transports, therefore, both masters and slaves must still respect the reserved slots and retransmission windows of synchronous links.

The setting of the sniff anchor points is established using Bluetooth clock values. Every Bluetooth device has a native clock CLKN that is derived from a free running system clock. For synchronization with other devices, offsets are used that, when added to the native clock, provide temporary Bluetooth clocks that are mutually synchronized. The clock has a cycle of about a day that is implemented with a 28-bit counter that wraps around at $2^{28}1$. The least significant bit (LSB) ticks in units of 312.5 μs (i.e. half a time slot), giving a clock rate of 3.2 kHz. The clock determines critical periods and triggers the events in the device. Four periods are important in the Bluetooth system: 312.5 μs, 625 μs, 1.25 ms, and 1.28 s; these periods correspond to the timer bits $CLK_0$, $CLK_1$, $CLK_2$, and $CLK_{12}$, respectively. CLK is the master clock of the piconet. It is used for all timing and scheduling activities in the piconet. All devices use the CLK to schedule their transmission and reception. The CLK is derived from the native clock CLKN by adding an offset. The offset is zero for the master since CLK is identical to its own native clock. Each slave adds an appropriate offset to its CLKN such that its CLK corresponds to the CLKN of the master. The master transmission always starts at even numbered time slots ($CLK_1=0$) and the slave transmission always starts at odd numbered time slots ($CLK_1=1$). The basic piconet physical channel is divided into time slots, each 625 μs in length. The time slots are numbered according to the most significant 27 bits of the Bluetooth clock $CLK_{28-1}$ of the piconet master. The slot numbering ranges from 0 to $2^{27}-1$ and is cyclic with a cycle length of $2^{27}$.

To enter the sniff mode, the master or slave issues a sniff command via the Link Manager (LM) protocol. This message includes the sniff interval $T_{sniff}$ and an offset $D_{sniff}$. In addition, an initialization flag indicates whether initialization procedure 1 or 2 is used. The device uses initialization 1 when the most significant bit (MSB) of the current master clock ($CLK_{27}$) is 0; it uses initialization 2 when the MSB of the current master clock ($CLK_{27}$) is 1. The slave applies the initialization method as indicated by the initialization flag irrespective of its clock bit value $CLK_{27}$. The sniff anchor point determined by the master and the slave is initialized on the slots for which the clock satisfies the applicable equation:

$CLK_{27-1}$ mod $T_{sniff}=D_{sniff}$ for initialization 1 or $(CLK_{27},CLK_{26-1})$ mod $T_{sniff}=D_{sniff}$ for initialization 2.

This equation indicates that $D_{sniff}$ must fall on an even slot.

After initialization, the clock value CLK(k+1) for the next sniff anchor point is derived by adding the fixed interval $T_{sniff}$ to the clock value of the current sniff anchor point:

$CLK(k+1)=CLK(k)+T_{sniff}$.

ACL packets can be specified as one of several packet types: DM1, DH1, DM3, DH3, DM5, and, DH5. (Also AUX1 is a ACL packet. AUX1 has no CRC and it is not retransmitted.) The designations "DM" stands for Data Medium rate and "DH" stands for Data High rate. DH packets achieve a higher rate because they use less error correction in the packet, leaving more room for data. The DM1 packet carries data information only. The payload has between 1 and 18 information bytes (including the 1-byte payload header) plus a 16-bit CRC code. The DM1 packet occupies a single time slot. The information plus CRC bits are coded with a rate 2/3 FEC. The payload header in the DM1 packet is 1 byte long. The DH1 packet is similar to the DM1 packet, except that the information in the payload is not FEC encoded. As a result, the DH1 packet has between 1 and 28 information bytes (including the 1-byte payload header) plus a 16-bit CRC code. The DH1 packet occupies a single time slot. The DM3 packet may occupy up to three time slots. The payload has between 2 and 123 information bytes (including the 2-byte payload header) plus a 16-bit CRC code. The information plus CRC bits are coded with a rate 2/3 FEC. The payload header in the DM3 packet is 2 bytes long. The length indicator in the payload header specifies the number of user bytes (excluding payload header and the CRC code). The DH3 packet is similar to the DM3 packet, except that the information in the payload is not FEC encoded. As a result, the DH3 packet has between 2 and 185 information bytes (including the 2-byte payload header) plus a 16-bit CRC code. The DH3 packet may occupy up to three time slots. The DM5 packet may occupy up to five time slots. The payload has between 2 and 226 information bytes (including the 2-byte payload header) plus a 16-bit CRC code. The payload header in the DM5 packet is 2 bytes long. The information plus CRC bits are coded with a rate 2/3 FEC. The length indicator in the payload header specifies the number of user bytes (excluding payload header and the CRC code). The DH5 packet is similar to the DM5 packet, except that the information in the payload is not FEC encoded. As a result, the DH5 packet has between 2 and 341 information bytes (including the 2-byte payload header) plus a 16-bit CRC code. The DH5 packet may occupy up to five time slots.

In the prior art, the Bluetooth link between the terminal and the headset typically uses the synchronous SCO transport and HV3 packet. Due to the synchronous nature of that transport, Bluetooth traffic can be estimated fairly accurately by the terminal. However, in the SCO transport, there are no retransmissions and therefore if the medium is reserved by the WLAN transceiver in the terminal at a particular moment or if the WLAN transceiver in the terminal is connected to the antenna, the SCO packet is permanently lost. For a VoIP packet received by the terminal from the WLAN access point and intended to be forwarded to the Bluetooth headset, a collision or packet loss will be likely occur once every 16 Bluetooth SCO slots. If HV2 or HV1 packets are used instead of HV3, collisions or packet loss will occur even more often, increasing the SCO packet loss by approximately 6%. Instead, if the medium is being used by the Bluetooth transceiver in the terminal when the WLAN transceiver in the terminal tries to access the medium, the WLAN packet is not permanently lost, but can be retransmitted as provided by the IEEE 802.11 standard. On the average, the WLAN transceiver in the terminal will have to retransmit once every $3^{rd}$ packet, which increases WLAN retransmissions by 30%.

The interference problem of WLAN and Bluetooth transceivers operating in the same terminal has been recognized in the prior art. The IEEE has developed a recommended practice to handle this problem, which is published in the IEEE Standards 802, Part 15.2: *Coexistence of Wireless Personal Area Networks with Other Wireless Devices Operating in Unlicensed Frequency Bands*. This IEEE recommended practice is based on establishing a control block between the WLAN and Bluetooth transceivers in a terminal. The control block assigns a higher priority to Bluetooth transmissions than to WLAN transmissions and selects which one of those transceivers is to be operating at a particular instant.

The first problem with the IEEE recommended practice is that it is only a recommendation and thus it cannot be known whether and how different WLAN transceiver manufacturers will implement this recommendation for access points and mobile terminals. Secondly the IEEE recommended practice assigns the WLAN acknowledgement (ACK) packet to have priority over the Bluetooth packet during WLAN retransmissions of interrupted WLAN packets. This will directly cause some permanent packet losses for the Bluetooth transceiver.

What is needed in the prior art is a method to reduce interference in simultaneous WLAN and Bluetooth signal handling, especially in voice over IP communications via a WLAN telephone to a Bluetooth headset.

SUMMARY OF THE INVENTION

The invention solves the problem of reducing interference in simultaneous wireless LAN (WLAN) and Bluetooth signal handling, especially in voice over IP communications via a WLAN telephone to a Bluetooth headset. The invention sets up a voice link between the terminal and the headset by establishing predefined slot times to listen for traffic in a Bluetooth Asynchronous Connection-Less (ACL) link. The predefined slot time to listen for traffic is known as a sniff anchor point and when established in the ACL link, the link operates in the sniff mode. In the sniff mode the headset may use the absent periods to enter reduced power mode. The sniff anchor points establish timing for assigning relative priorities to the WLAN and Bluetooth ACL packet traffic. A higher priority is assigned to WLAN packet traffic when it collides with original Bluetooth ACL packet traffic during a sniff anchor point. If a higher priority WLAN packet begins transmitting or is received at the terminal during an anchor point, the terminal aborts transmitting the original Bluetooth ACL packet. Thereafter, a higher priority is assigned to the terminal's retransmission of aborted Bluetooth ACL packets and the headset's response ACL packets in available Bluetooth slots following the anchor point.

Any additional Synchronous Connection-Oriented (SCO) or Extended Synchronous Connection-Oriented (eSCO) packets that may be transmitted between the terminal and the headset have priority over both original and retransmitted ACL packets. In stereo headsets, for example, the ACL packets can carry one audio channel and the synchronous packets can carry the other audio channel. In video/phone or virtual reality headsets, for example, the ACL packets can carry the audio data and the synchronous packets can carry the compressed image data. If the synchronous SCO or eSCO packets are scheduled to be transmitted by the terminal during a sniff anchor point, the terminal aborts transmitting either the original or the retransmission Bluetooth ACL packet until an available slot occurs after the anchor point, which is not being used by SCO or eSCO packets.

The invention provides a new method of operation for the control block between the WLAN and Bluetooth transceivers in a terminal, which selects which one of those transceivers is to be operating at a particular instant. In accordance with the invention, ACL packets used on the ACL logical transport include retransmission of aborted packets in slots following an anchor point if the transmission of the last prior Bluetooth packet has been interrupted by a higher priority transmission of WLAN packets during the anchor point. The new control block method assigns to the Bluetooth retransmission packet a higher priority over the WLAN packets in slots following the anchor point, to assure retransmission of the interrupted Bluetooth packet.

Further in accordance with the invention, after the headset connection has been established, the terminal will perform a role switch, if needed, to assume the master role. As the master device, the terminal will set up an ACL link with the headset and set the ACL packet type. For example, the terminal will set up a 3-slot DH3 packet carrying an average of 163 bytes of voice data per packet to be sent every 20 ms to achieve a 64 kbps data stream. The terminal will then setup the headset in the sniff mode and set sniff anchor points at Tsniff intervals, for example, of 32 slots, which is 20 ms in duration. The sniff anchor points establish timing for assigning relative priorities to the WLAN and Bluetooth traffic.

During operation of the invention, a higher priority is assigned to WLAN packet traffic when it collides with original Bluetooth ACL packet traffic during a sniff anchor point. The WLAN traffic is assigned a higher priority than the Bluetooth ACL traffic so that the first-time transmission of a Bluetooth packet is suppressed or interrupted when a WLAN packet is simultaneously either being received or transmitted during an anchor point. To assure that the suppressed or interrupted Bluetooth ACL packet is eventually retransmitted successfully, the Bluetooth retransmission packet is assigned a higher priority than the WLAN traffic in slots following the anchor point. A higher priority is assigned to the terminal's retransmission of aborted Bluetooth ACL packets and the headset's response ACL packets in Bluetooth slots following the anchor point. In other words, any WLAN packet scheduled or known to have started transmission by the terminal is aborted during the retransmission of a Bluetooth ACL packet in slots following the anchor point. The existing WLAN protocol will later retransmit the aborted WLAN packet. In effect, collision with WLAN traffic can be reduced by scheduling the Bluetooth ACL transmission later, if necessary. In this manner WLAN packet retransmissions are used less often than in the prior art, thus imposing less of an encumbrance on the WLAN traffic.

Further in accordance with the invention, the headset listens for the terminal's Bluetooth ACL packet during an anchor point. When the headset detects the terminal's ACL packet in an anchor point, it waits for the slave-to-master slot to transmit its response ACL packet. If the headset receives a higher priority SCO packet, or eSCO packet or does not receive any BT packet during the sniff anchor point or during the following slave-to-master slot, then the headset aborts sending its response ACL packet The terminal will recognize that it has not received that response from the headset (because of interference). Thereafter, headset waits to receive the retransmitted Bluetooth ACL packet in the next available master-to-slave slot after the anchor point. When the headset detects the retransmitted Bluetooth ACL packet in the next available master-to-slave slot after the anchor point, it (re) transmits its response ACL packet in the next slave-to-master slot.

The audio data transported on the ACL link between the terminal and the headset has time-based characteristics that may be retransmitted until received or expired. The terminal is programmed to automatically flush the aborted ACL voice packets after the packets have expired because of waiting too long for an available slot for retransmission. During operation of the invention, the terminal counts the frequency of occurrence "NF" of flushed ACL voice packets. If the frequency of occurrence "NF" of flushed ACL voice packets is greater than a predetermined value "MAX", then the duration of the listening window following the sniff anchor point can be increased. The headset is restarted in the sniff mode and the sniff parameter values are increased for sniff attempt ($N_{sniff\ attempt}$) and sniff timeout ($N_{sniff\ timeout}$).

An advantage of the invention is that power consumption is reduced in the headset by using the ACL link to carry voice data during sniff anchor points and aligning these anchor points with the WLAN VoIP transmission.

The resulting invention is particularly advantageous in areas of high WLAN traffic, such as in a business office, where frequent retransmission of interrupted WLAN packets would significantly impair WLAN traffic capacity.

Although establishing the Bluetooth connection with the terminal as the master device is the preferred way to operate the invention, retaining the headset in the role of the master device can also be used to establish the Bluetooth connection. In this alternate embodiment, the terminal and headset are programmed so that the headset remains the master device, or requires master to slave switch, in establishing the Bluetooth connection. As the master device, the headset can set up the ACL link with the terminal, which enables the headset to use the retransmission feature as described above.

In another alternate embodiment, the wireless PAN operating band can be an infrared band or an optical band, as well as a radio frequency band.

The resulting invention solves the problem of reducing interference in simultaneous WLAN and Bluetooth signal handling, especially in voice over IP communications via a WLAN to a Bluetooth headset.

DESCRIPTION OF THE FIGURES

FIG. 3 is a diagram according to an embodiment of the present invention showing the sniff anchor points, which are spaced regularly with an interval of Tsniff.

FIG. 4 is a timing diagram according to an embodiment of the present invention showing the WLAN using the channel during a sniff anchor point.

FIG. 5 is a timing diagram according to an embodiment of the present invention showing sniff anchor point usage when there are more anchor points than required for a particular voice traffic application.

DISCUSSION OF THE PREFERRED EMBODIMENT

Figure 1:
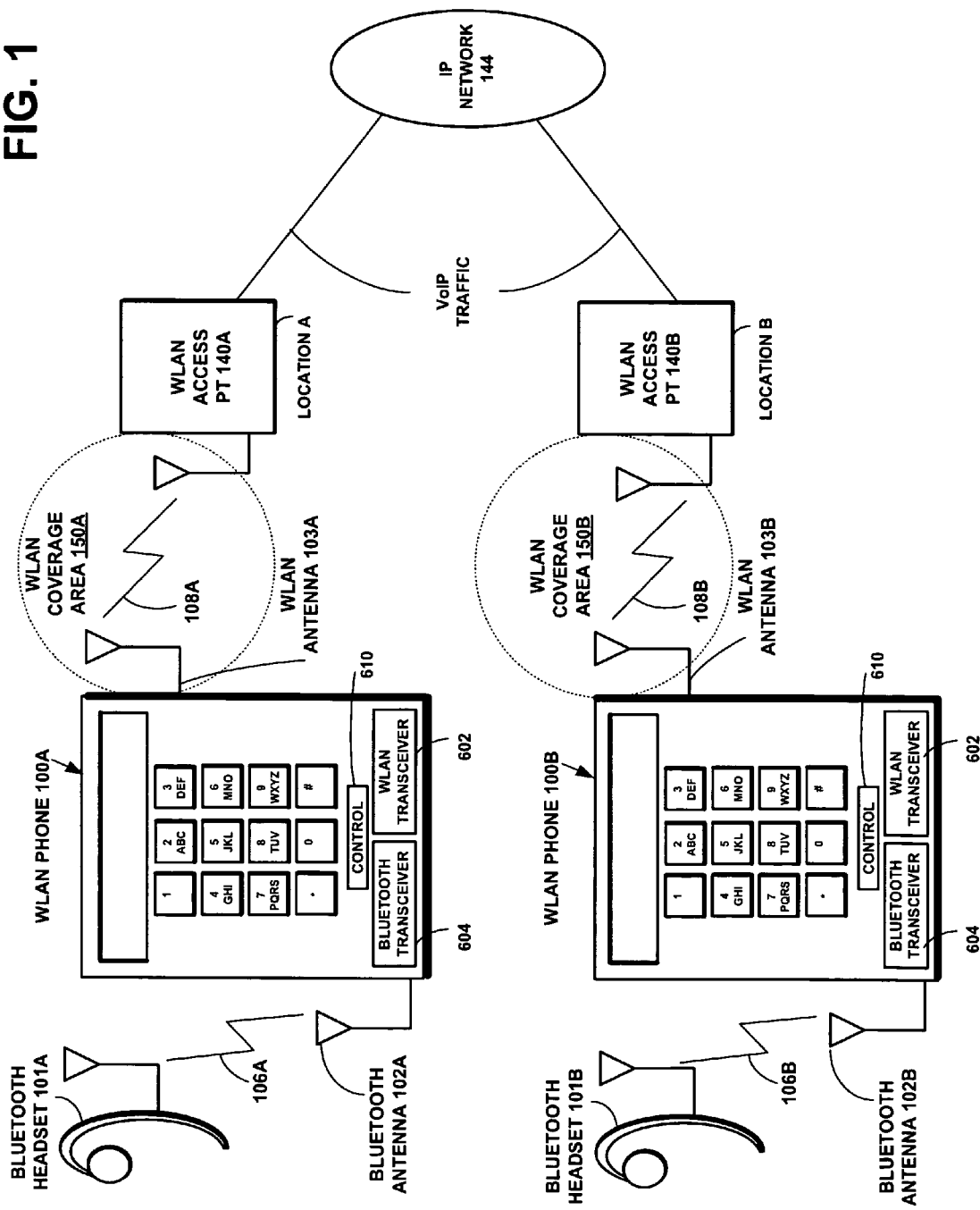
FIG. 1 is a network diagram according to an embodiment of the present invention showing a voice over IP (VoIP) communications network via a WLAN telephone to a Bluetooth headset. The telephone terminal includes a Bluetooth transceiver module connected to a Bluetooth antenna and a WLAN transceiver connected to a separate WLAN antenna.

FIG. 1 is a network diagram according to an embodiment of the present invention showing a voice over IP (VoIP) communications network via a WLAN telephone 100A to a Bluetooth headset 101A. The telephone terminal 100A includes a Bluetooth transceiver 604 connected to a Bluetooth antenna 102A and a WLAN transceiver 602 connected to a separate WLAN antenna 103A. The Bluetooth transceiver 604 operates in the Bluetooth network 106A to communicate with the wireless headset 101A using the ISM band of 2.4 GHz and the Bluetooth v1.2 Specification communications protocol to exchange Bluetooth packets. When a Bluetooth link 106A is established between the telephone terminal 100A and the wireless headset 101A, packets are exchanged over the air between the terminal 100A and the wireless headset 101A by alternately transmitting and receiving the encoded audio data in consecutive Bluetooth slots. In stereo headsets 101A and 101B, for example, Bluetooth ACL packets can carry one audio channel and Bluetooth synchronous eSCO packets can carry the other audio channel. The terminal 100A can have the form factor of a cellular telephone, a notebook computer, or a wearable or otherwise portable communications device for conducting synchronous or isochronous data having time-based characteristics between a WLAN network 108A and a Bluetooth I/O device, such as the headset 101A.

Figure 2:
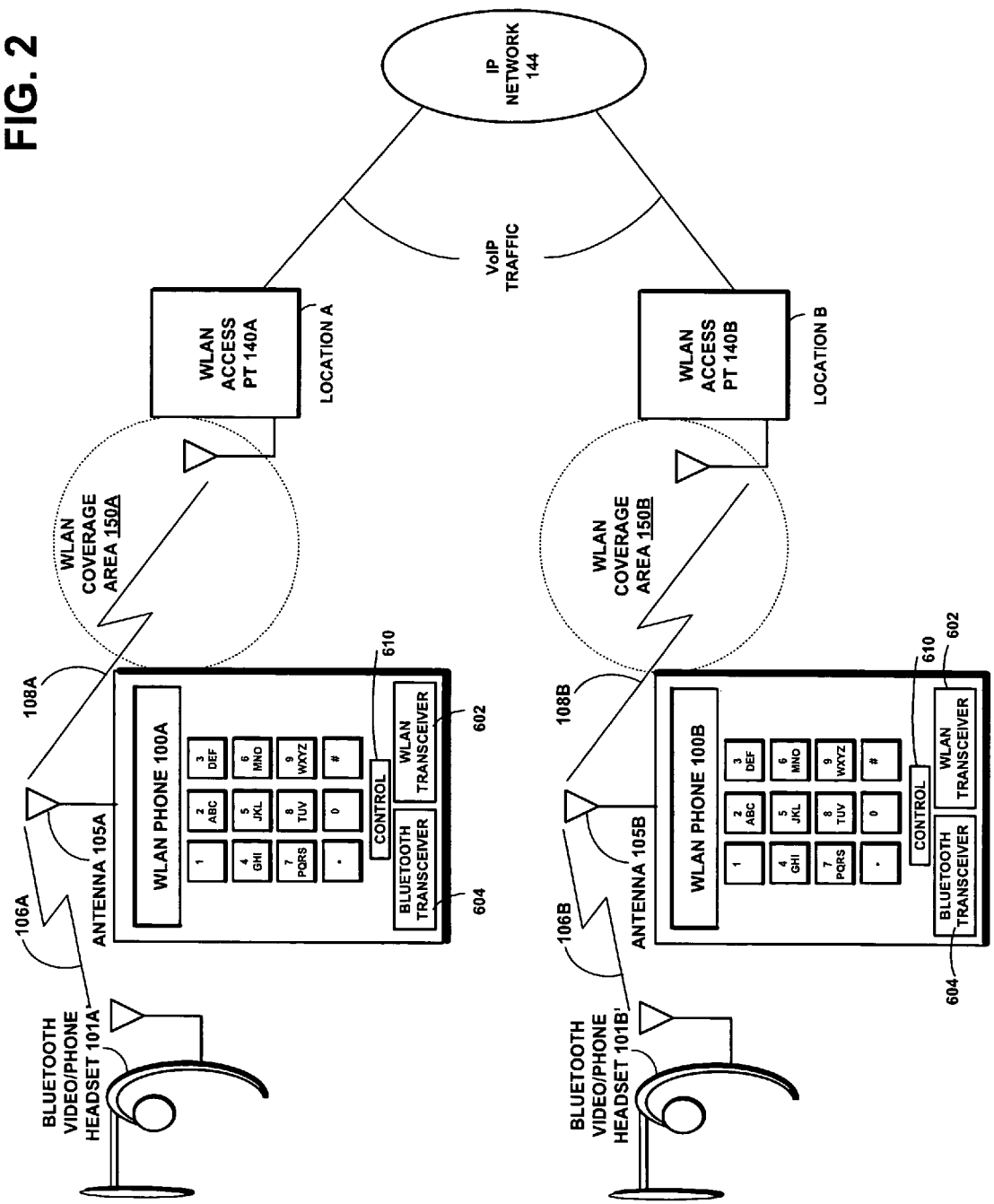
FIG. 2 is a network diagram according to an embodiment of the present invention showing a voice over IP (VoIP) communications network via a WLAN telephone to a Bluetooth video/phone headset. The telephone terminal includes a Bluetooth transceiver module and a WLAN transceiver connected to the same antenna.

FIG. 2 shows the same voice over IP (VoIP) communications network as shown in FIG. 1, but with the WLAN telephone terminal 100A having its Bluetooth transceiver 604 and WLAN transceiver 602 connected to the same antenna 105A. The headsets 101A' and 101B' are video/phone headsets. In video/phone or virtual reality headsets 101A' and 101B', for example, Bluetooth ACL packets can carry audio data and Bluetooth synchronous eSCO packets can carry compressed image data to be viewed by the wearer through projection onto half-silvered glasses.

The WLAN terminal 100A and the Bluetooth headset 101A exchange inquiry and paging packets to establish a connection and a service level. Then by means of an internal programmed event or user action, the ACL and eSCO links are established. After this stage, the basic level audio link is established.

The WLAN access point 140A at location A in FIG. 1 also has an IEEE 802.11b transceiver connected to its own WLAN antenna. When an RF communications link 108A conforming to the IEEE 802.11b Standard is established between the telephone terminal 100A and the access point 140A, data frames containing encoded audio data are exchanged over the WLAN coverage area 150A between the telephone terminal 100A and the access point 140A. The RF communications link 108A can also conform to the IEEE 802.11g Standard. The access point 140A is shown connected by wireline to the IP Network 144, to exchange data frames containing voice over internet (VoIP) encoded audio data in a telephone network.

FIG. 1 shows a second WLAN access point 140B at location B connected by wireline to the IP Network 144, establishing a second WLAN coverage area 150B. The WLAN access point 140B has an IEEE 802.11b transceiver connected to its own WLAN antenna. The second WLAN access point 140B communicates with a second WLAN telephone terminal 100B, which includes an IEEE 802.11b transceiver connected to a WLAN antenna 103B. When an RF communications link 108B conforming to the IEEE 802.11b Standard is established between the telephone terminal 100B and the access point 140B, data frames containing voice over internet (VoIP) encoded audio data are exchanged over the WLAN coverage area 150B between the telephone terminal 100B and the access point 140B. The RF communications link 108B can also conform to the IEEE 802.11g Standard. The telephone terminal 100B includes a Bluetooth transceiver module connected to the Bluetooth antenna 102B. The wireless headset 101B also includes a Bluetooth transceiver module connected to its own Bluetooth antenna. When a Bluetooth link 106B is established between the telephone terminal 100B and the wireless headset 100B, packets are exchanged over the air between the terminal 100B and the wireless headset 100B by alternately transmitting and receiving the encoded audio data in consecutive Bluetooth slots. FIG. 2 shows the WLAN telephone terminal 100B having its Bluetooth transceiver 604 and WLAN transceiver 602 connected to the same antenna 105B. In this manner, voice conversations can be established between users of the wireless headsets 101A' and 101B'.

The invention sets up a voice link 106A between the terminal 100A and the headset 101A by establishing predefined slot times to listen for traffic in a Bluetooth Asynchronous Connection-Less (ACL) link. The predefined slot time to listen for traffic is known as a sniff anchor point and when established in the ACL link, the link operates in the sniff mode. In the sniff mode the headset may use the absent periods to enter reduced power mode. FIG. 3 is a diagram showing the sniff anchor points, which are spaced regularly with an interval of Tsniff. The sniff anchor points establish timing for assigning relative priorities to the WLAN and Bluetooth ACL packet traffic. A higher priority is assigned to WLAN packet traffic when it collides with original Bluetooth ACL packet traffic during a sniff anchor point. If a higher priority WLAN packet begins transmitting or is received at the terminal during an anchor point, the terminal aborts transmitting the original Bluetooth ACL packet. Thereafter, a higher priority is assigned to the terminal's retransmission of aborted Bluetooth ACL packets and the headset's response ACL packets in available Bluetooth slots following the anchor point. FIG. 4 is a timing diagram showing the WLAN using the channel during a sniff anchor point. FIG. 5 is a timing diagram showing sniff anchor point usage when there are more anchor points than required for a particular voice traffic application. An advantage of the invention is that power consumption is reduced in the headset by using the ACL link to carry voice data during sniff anchor points and aligning these anchor points with the WLAN VoIP transmission.

Figure 6:
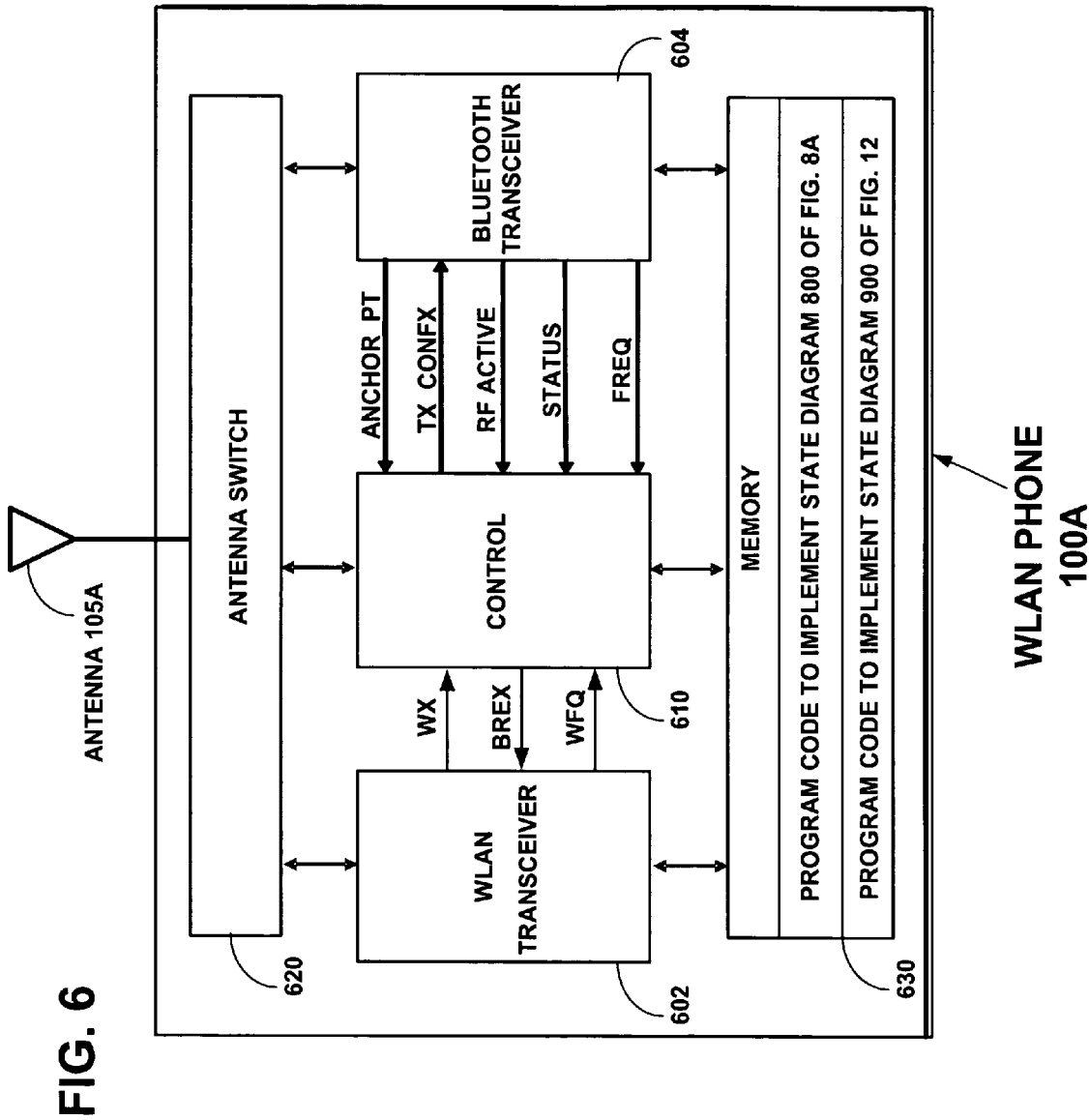
FIG. 6 is a functional block diagram according to an embodiment of the present invention showing the WLAN telephone with a control module that coordinates the operation of the Bluetooth transceiver and the WLAN transceiver.

The invention provides a new method of operation for the control block 610 between the WLAN transceiver 602 and Bluetooth transceiver 604 in a terminal 100A, which selects which one of those transceivers is to be operating at a particular instant. FIG. 6 is a functional block diagram showing the WLAN telephone 100A with a control module 610 that coordinates the operation of the Bluetooth transceiver 604, the WLAN transceiver 602, and the antenna switch 620 connected to the antenna 105A. The memory 630 in the terminal 100A of FIG. 6 stores program code to implement the state diagram 800 of FIG. 8A and the state diagram 900 of FIG. 12. Portions of this program code can also be stored in the respective control module 610, the WLAN transceiver 602, and the Bluetooth transceiver 604. In accordance with the invention, ACL packets used on the ACL logical transport include retransmission of aborted packets in slots following an anchor point if the transmission of the last prior Bluetooth packet has been interrupted by a higher priority transmission of WLAN packets during the anchor point. The new control block method assigns to the Bluetooth retransmission packet a higher priority over the WLAN packets in slots following the anchor point, to assure retransmission of the interrupted Bluetooth packet.

Figure 7:
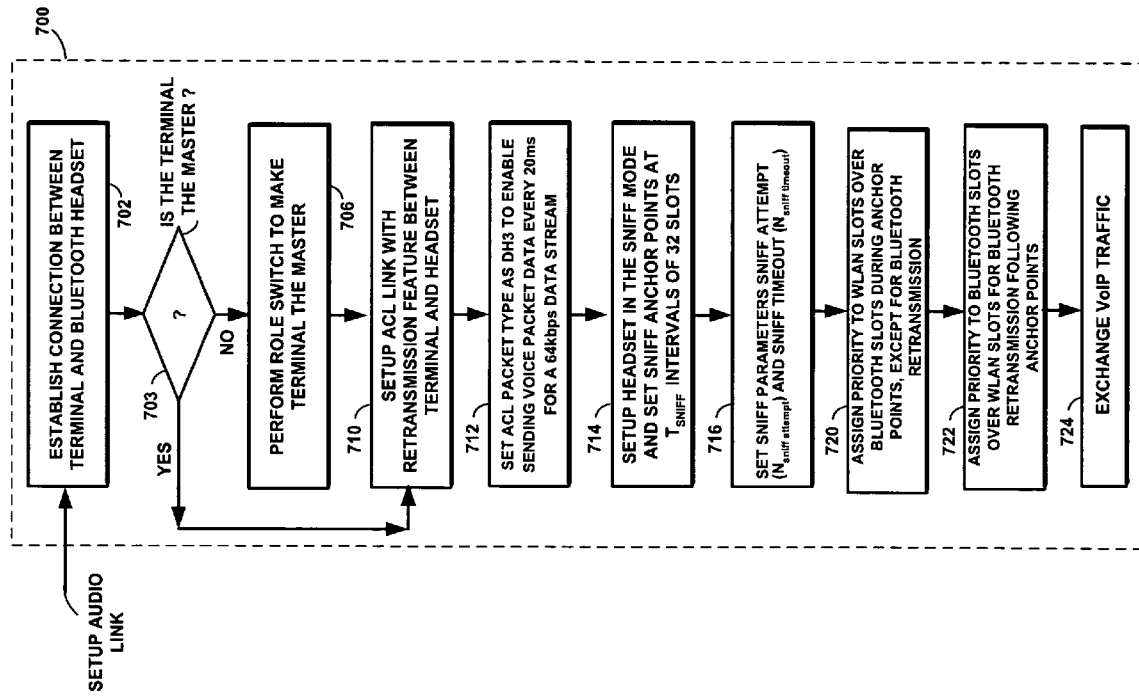
FIG. 7 is a flow diagram according to an embodiment of the present invention showing the process of establishing a connection between the Bluetooth terminal and the Bluetooth headset to exchange voice packets that have been exchanged with the WLAN access point.

Further in accordance with the invention, FIG. 7 is a flow diagram 700 showing the process of establishing a connection between the Bluetooth terminal and the Bluetooth headset to exchange voice packets that have been exchanged with the WLAN access point. After the headset connection has been established in Step 702, the terminal will perform a role switch, if needed, in Step 706 to assume the master role. Step 703 determines if the terminal is the initial master. If it is, then the steps flow to step 710. Alternately, if the terminal is not the initial master, then the steps flow to step 706. As the master device, the terminal will set up an ACL link with the headset in Step 710 and set the ACL packet type in Step 712. For example, the terminal will set up a 3-slot DH3 packet carrying an average of 163 bytes of voice data per packet to be sent every 20 ms to achieve a 64 kbps data stream. The terminal will then setup the headset in the sniff mode in Step 714 and set sniff anchor points at Tsniff intervals, for example, of 32 slots, which is 20 ms in duration. The sniff anchor points establish timing for assigning relative priorities to the WLAN and Bluetooth traffic. The sniff parameter values are set in Step 716 for sniff attempt ($N_{sniff\ attempt}$) and sniff timeout ($N_{sniff\ timeout}$) to establish the duration of the listening window following the sniff anchor point. In Step 720, a higher priority is assigned to WLAN packet traffic when it collides with original Bluetooth ACL packet traffic during a sniff anchor point. In Step 722, a higher priority is assigned to the terminal's retransmission of aborted Bluetooth ACL packets and the headset's response ACL packets in available Bluetooth slots following the anchor point. Then in Step 724 the terminal 100A, headset 101A, and access point 140A can then begin to exchange VoIP traffic.

Figure 8A:
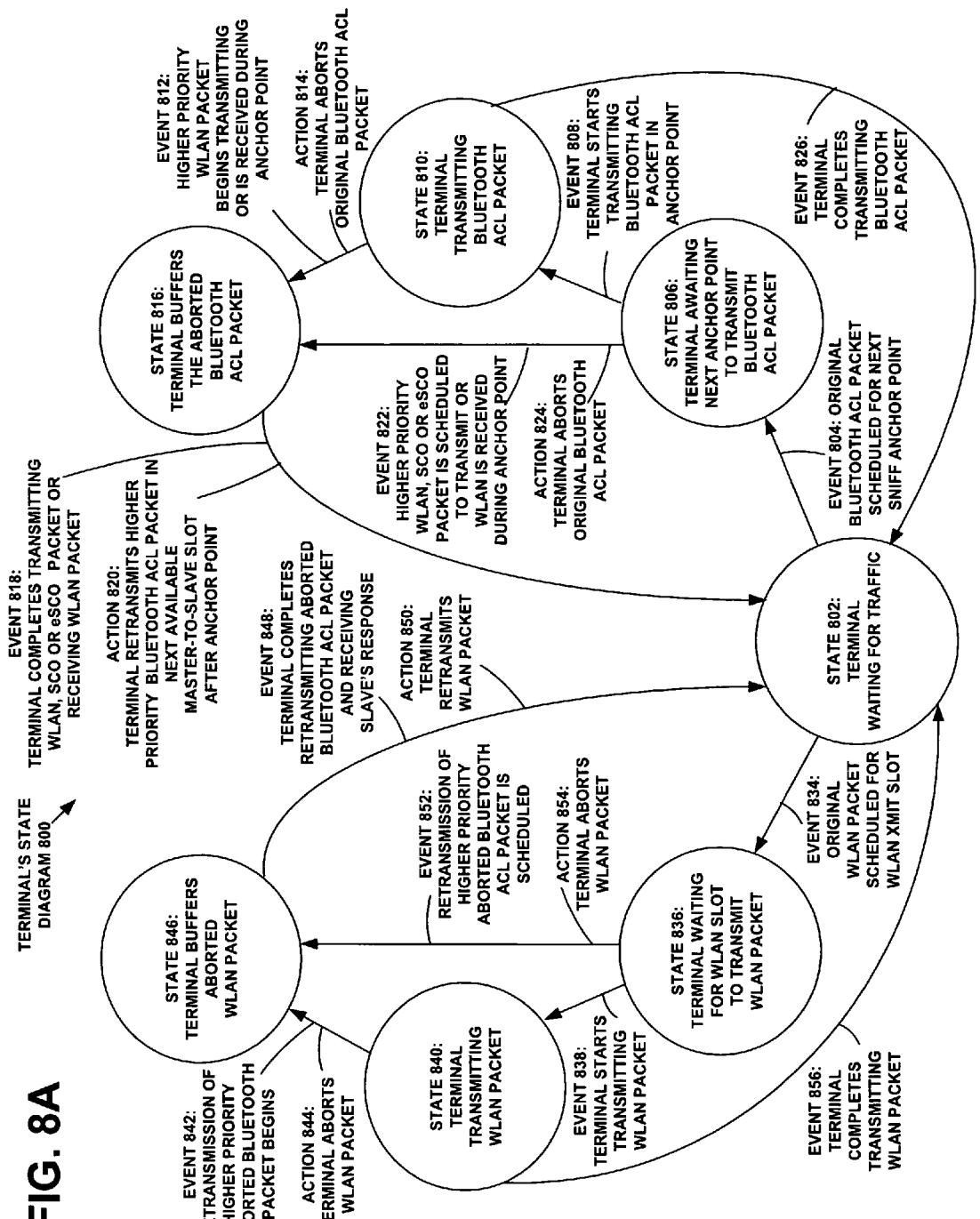
FIG. 8A is a state diagram according to an embodiment of the present invention showing the operating states established by the controller in the terminal to assign a higher priority to the WLAN transmissions during sniff anchor point slots and assign a higher priority to the Bluetooth retransmissions over WLAN transmissions during slots following sniff anchor point slots.

FIG. 8A is a state diagram showing the operating states established by the controller in the terminal to assign a higher priority to the WLAN transmissions during sniff anchor point slots and assign a higher priority to the Bluetooth ACL retransmissions over WLAN transmissions during slots following sniff anchor point slots. During operation of the invention, a higher priority is assigned to WLAN packet traffic when it collides with original Bluetooth ACL packet traffic during a sniff anchor point. The WLAN traffic is assigned a higher priority than the Bluetooth ACL traffic so that the first-time transmission of a Bluetooth ACL packet is suppressed or interrupted when a WLAN packet is simultaneously either being received or transmitted during an anchor point. To assure that the suppressed or interrupted Bluetooth ACL packet is eventually retransmitted successfully, the Bluetooth ACL retransmission packet is assigned a higher priority than the WLAN traffic in slots following the anchor point. A higher priority is assigned to the terminal's retransmission of aborted Bluetooth ACL packets and the headset's response ACL packets in Bluetooth slots following the anchor point. Any WLAN packet scheduled or known to have started transmission by the terminal is aborted during the retransmission of a Bluetooth ACL packet in slots following the anchor point. The existing WLAN protocol will later retransmit the aborted WLAN packet. In effect, collision with WLAN traffic can be reduced by scheduling the Bluetooth ACL transmission later, if necessary. In this manner WLAN packet retransmissions are used less often than in the prior art, thus imposing less of an encumbrance on the WLAN traffic.

The state diagram 800 of FIG. 8A shows the operating states established by the control module 610 to assign a higher priority to WLAN packet traffic when it collides with original Bluetooth ACL packet traffic during a sniff anchor point and to assign a higher priority to the terminal's retransmission of aborted Bluetooth ACL packets and the headset's response ACL packets in available Bluetooth slots following the anchor point. The state diagram 800 for terminal 100A begins in the quiescent State 802: where the terminal is waiting for traffic. In State 802, if Event 804 occurs where an original Bluetooth ACL packet is scheduled for a next sniff anchor point, then the state transitions to State 806 where the terminal is waiting for the anchor point to begin to enable transmitting the Bluetooth ACL packet. In State 806, if Event 808 occurs where the terminal starts transmitting the Bluetooth ACL packet in the sniff anchor point, then the state transitions to State 810 where the terminal is actively transmitting the Bluetooth ACL packet in the anchor point. In State 810, if Event 812 occurs where a higher priority WLAN packet begins transmitting or is received during the sniff anchor point, then Action 814 is taken where the terminal aborts transmitting the original Bluetooth ACL packet and the state transitions to State 816 where the terminal buffers the aborted Bluetooth ACL packet. In State 816, if Event 818 occurs where the terminal completes transmitting the WLAN packet or a SCO or eSCO packet of completes receiving a WLAN packet, then the Action 820 is taken where the terminal retransmits the aborted Bluetooth ACL packet in the next available master-to-slave slot after the sniff anchor point and the state transitions back to the quiescent State 802 where the terminal is waiting for traffic. There is a second possible event that can occur in State 806. In State 806, if Event 822 occurs where a higher priority WLAN packet or a SCO or eSCO packet is scheduled to be received or transmitted or if a WLAN packet is received during the anchor point, then Action 824 is taken where the terminal aborts the original Bluetooth ACL packet and the state transitions to State 816. There is a second possible event that can occur in State 810. In State 810, if Event 826 occurs where terminal completes transmitting the Bluetooth ACL packet, then the state transitions back to the quiescent State 802: where the terminal is waiting for traffic.

In State 802 of FIG. 8A, if Event 834 occurs where an original WLAN packet is scheduled for a WLAN transmit slot, then the state transitions to State 836 where the terminal is waiting for the WLAN slot to begin to enable transmitting the WLAN packet. In State 836, if Event 838 occurs where the terminal starts transmitting the WLAN packet, then the state transitions to State 840 where the terminal is actively transmitting the WLAN packet. In State 840, if Event 842 occurs where a higher priority retransmission begins of an aborted Bluetooth ACL packet, then Action 844 is taken where the terminal aborts the WLAN packet and the state transitions to State 846 where the terminal buffers the aborted WLAN packet. In State 846, if Event 848 occurs where the terminal completes retransmitting the aborted Bluetooth ACL packet, then Action 850 is taken where the terminal retransmits the aborted WLAN packet and the state transitions back to the quiescent State 802 where the terminal is waiting for traffic. There is a second possible event that can occur in State 836. In State 836, if Event 852 occurs where a higher priority retransmission of an aborted Bluetooth ACL packet is scheduled to transmit, the Action 854 is taken where the terminal aborts the WLAN packet and transitions to State 846. There is a second possible event that can occur in State 840. In State 840, if Event 856 occurs where the terminal completes transmitting the WLAN packet, then the state transitions back to the quiescent State 802 where the terminal is waiting for traffic.

In handling collisions of ACL or eSCO packets with WLAN packets, the WLAN transceiver 602 in FIG. 6 signals to the control module 610 with the WX signal when it is scheduled to transmit or is transmitting WLAN packets. The Bluetooth transceiver 604 signals to the control module 610 with the ANCHOR_ PT signal whether a sniff anchor point is occurring. The Bluetooth transceiver 604 signals to the control module 610 with the STATUS signal whether it has an aborted ACL packet or an aborted eSCO packet ready for retransmission. The control module 610 signals to the Bluetooth transceiver 604 with the TX_CONFX signal if it is to abort any transmission of an original ACL packet or eSCO packet. The control module 610 signals to the WLAN transceiver 602 with the BREX signal if it is to abort any scheduled WLAN packet transmission or abort transmitting any WLAN packets. The Bluetooth transceiver 604 also signals to the control module 610 with the RF_ACTIVE signal whether it is transmitting an ACL packet or eSCO packet. The Bluetooth transceiver 604 in FIG. 6 signals to the control module 610 with the FREQ signal to provide its timing. The WLAN transceiver 602 signals to the control module 610 with the WFQ signal to provide its timing. The signals are controlled by execution of the program code in memory 630 in accordance with the state diagram 800 of FIG. 8A and the state diagram 900 of FIG. 12.

The Bluetooth transceiver 604 signals to the control module 610 with the ANCHOR_PT signal whether a sniff anchor point is occurring. If a sniff anchor point is occurring and the WLAN transceiver 602 signals to the control module 610 with the WX signal that it is scheduled to transmit or is transmitting WLAN packets, then the control module 610 raises the TX_CONFX signal to the Bluetooth transceiver 604 causing it to abort any transmission of an original Bluetooth ACL packet. This is shown in the state diagram of FIG. 8A.

If the STATUS signal is low, then there is no aborted Bluetooth ACL or eSCO packet ready for retransmission. In response to when the WLAN transceiver 602 signals to the control module 610 with the WX signal that it is scheduled to transmit or is transmitting WLAN packets in combination with the STATUS signal being low, indicating that there is no aborted Bluetooth ACL or eSCO packet ready for retransmission, the control module 610 raises the TX_CONFX signal to the Bluetooth transceiver 604 causing it to abort any transmission of an original Bluetooth ACL or eSCO packet. This is shown in the state diagrams of FIG. 8A and FIG. 12.

If the STATUS signal is high, indicating that there is an aborted Bluetooth ACL or eSCO packet ready for retransmission, then in response the control module 610 signals to the WLAN transceiver 602 with the BREX signal to abort any scheduled WLAN packet transmission or abort transmitting any WLAN packets. This enables the Bluetooth transceiver 604 to retransmit the aborted Bluetooth ACL packet in the next available master-to-slave slot after the sniff anchor point. This also enables the Bluetooth transceiver 604 to retransmit the aborted Bluetooth eSCO packet in an eSCO retransmission slot. This is shown in the state diagrams of FIG. 8A and FIG. 12.

Figure 8B:
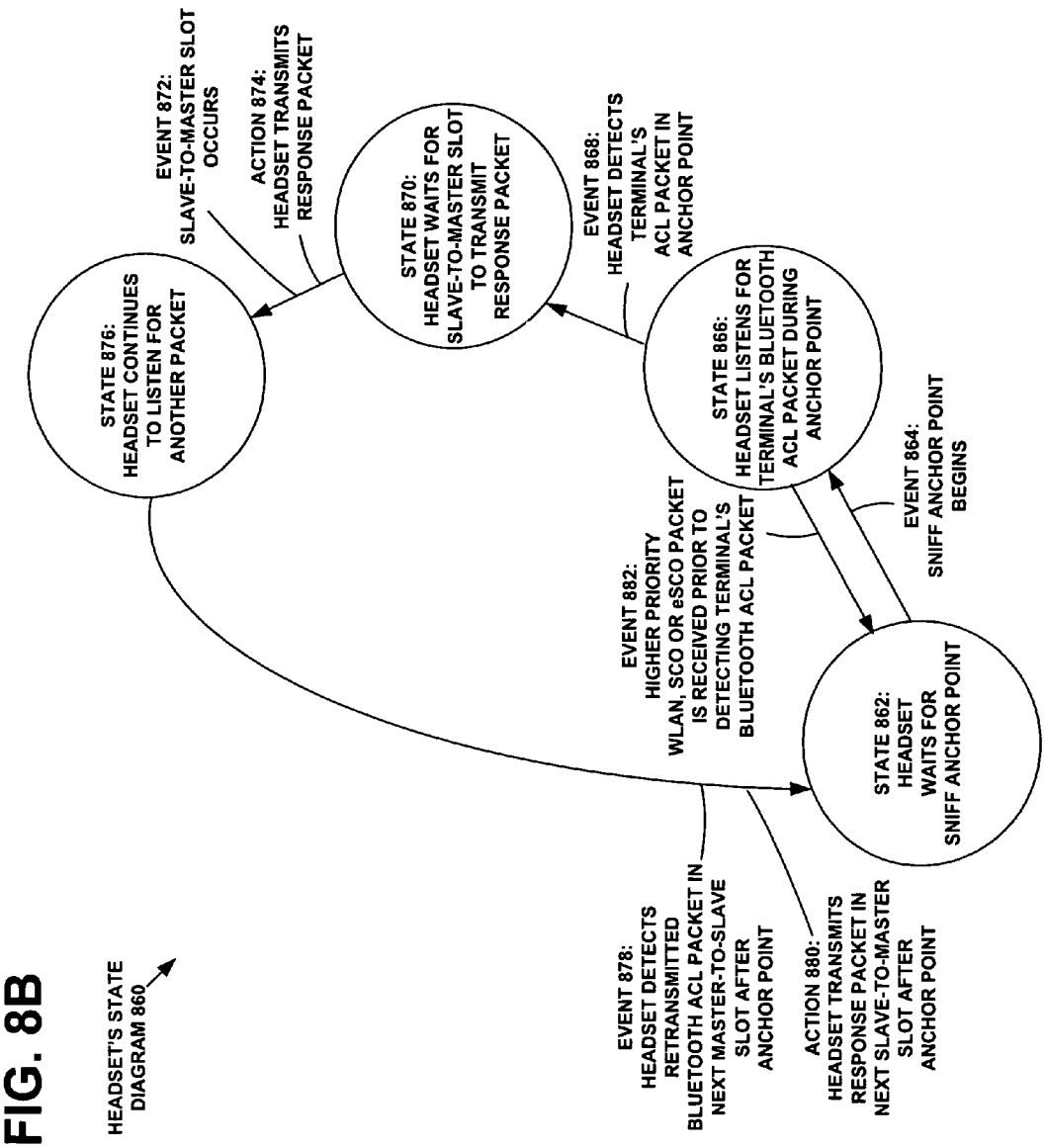
FIG. 8B is a state diagram according to an embodiment of the present invention showing the operating states established by the headset to listen for the terminal during sniff anchor point slots and to interact with the terminal during slots following sniff anchor point slots.

Further in accordance with the invention, FIG. 8B is a state diagram 860 showing the operating states established by the headset to listen for the terminal during sniff anchor point slots and to interact with the terminal during slots following sniff anchor point slots. In state 862 the headset waits for the sniff anchor point. If event 864 occurs, the sniff anchor point begins, the state transitions to state 866 where the headset listens for the terminal's Bluetooth ACL packet during the anchor point. If event 868 occurs that the headset detects the terminal's ACL packet in the anchor point, then the state transitions to state 870 where the headset waits for the slave-to-master slot to transmit its response ACL packet. When the slave-to-master slot event 872 occurs, then action 874 is taken, the headset transmits its response ACL packet. If a WLAN packet interferes with the response packet from the headset, the terminal will recognize that it has not received that response from the headset. The headset continues to listen for the receipt of another ACL packet from the terminal in State 876. The headset waits to receive the retransmitted Bluetooth ACL packet in the next available master-to-slave slot after the anchor point. When event 878 occurs that the headset detects the retransmitted Bluetooth ACL packet in the next available master-to-slave slot after the anchor point, then action 880 is taken in which the headset transmits its response ACL packet in the next slave-to-master slot to the terminal.

Figure 9:
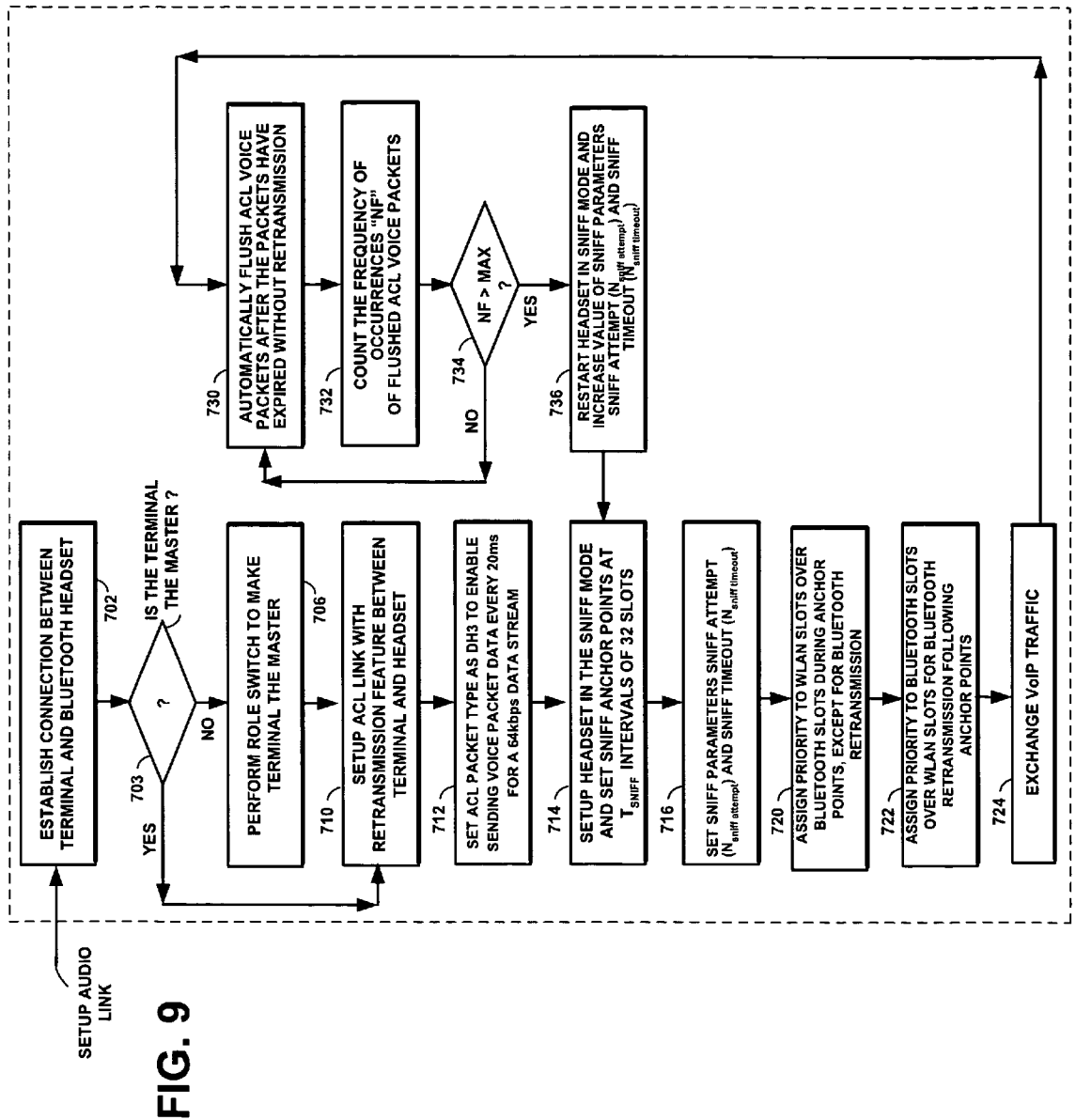
FIG. 9 is a flow diagram according to an embodiment of the present invention showing steps in addition to those shown in FIG. 7, to enlarge the duration of the headset's listening window following the sniff anchor point if the frequency of occurrence of flushed ACL voice packets is greater than a predetermined value.
Figure 10A:
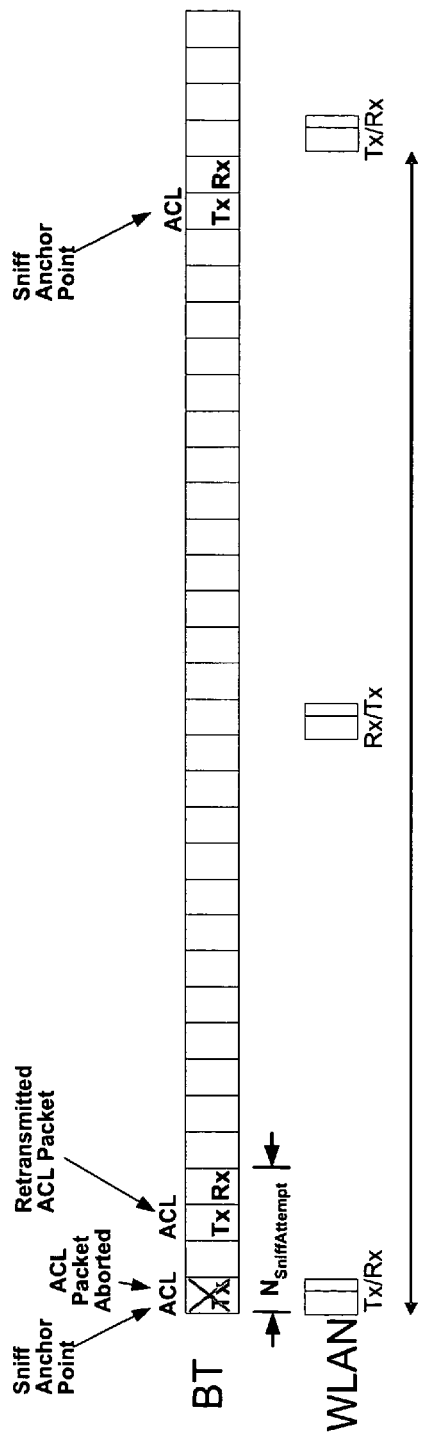
FIG. 10A is a timing diagram according to an embodiment of the present invention showing the collision of an original Bluetooth ACL packet with a WLAN packet in a sniff anchor point and the successful retransmission of the ACL packet within an $N_{sniff\,attempt}$ window of four slots in length.
Figure 10B:
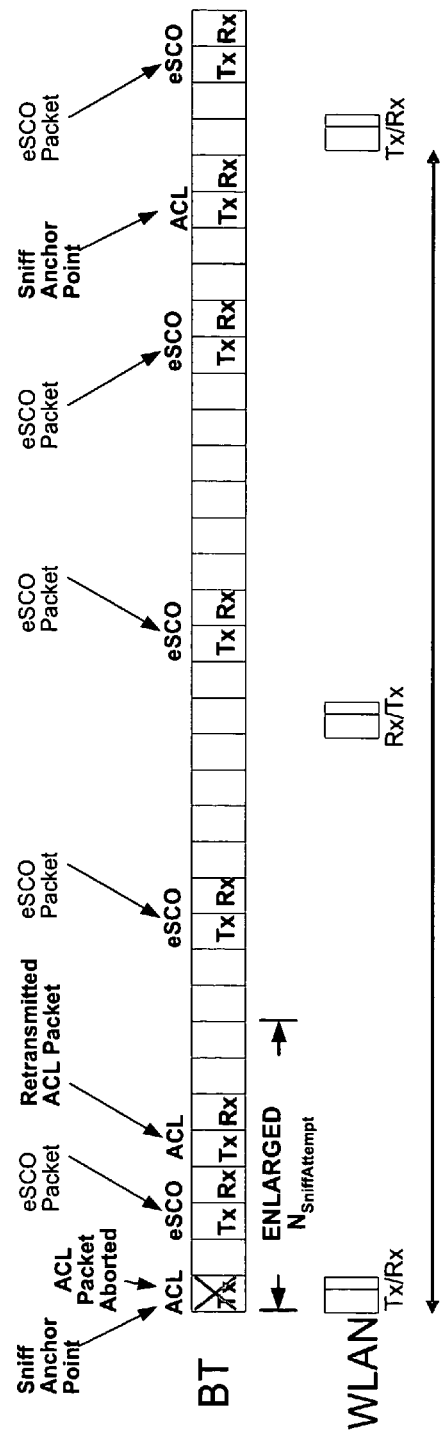
FIG. 10B is a timing diagram according to an embodiment of the present invention showing the collision of an original Bluetooth ACL packet with a WLAN packet in a sniff anchor point and a rescheduling of the retransmission ACL packet with an eSCO packet in the following slot, the diagram further showing the successfully delayed retransmission of the ACL packet within an enlarged $N_{sniff\,attempt}$ window of eight slots in length.

The audio data transported on the ACL link between the terminal and the headset has time-based characteristics that may be retransmitted until received or expired. The terminal is programmed to automatically flush the aborted ACL voice packets after the packets have expired because of waiting too long for an available slot for retransmission. FIG. 9 is a flow diagram 700' showing steps 730 to 736 in addition to steps 702 to 724 shown in the flow diagram 700 of FIG. 7, to enlarge the duration of the headset's listening window following the sniff anchor point if the frequency of occurrence of flushed ACL voice packets is greater than a predetermined value. During operation of the invention, step 730 flushes the aborted ACL voice packets after the packets have expired. Then in step 732 the terminal counts the frequency of occurrence "NF" of flushed ACL voice packets. Step 734 determines if the frequency of occurrence "NF" of flushed ACL voice packets is greater than a predetermined value "MAX" and if it is, then the duration of the listening window following the sniff anchor point is increased in step 736. The headset is restarted in the sniff mode in step 736 and the sniff parameter values are increased for sniff attempt ($N_{sniff\ attempt}$) and sniff timeout ($N_{sniff\ timeout}$). Then the program flows to step 714 to complete setting up the headset in the sniff mode and setting the anchor points, as described above. FIG. 10A is a timing diagram showing the collision of an original Bluetooth ACL packet with a WLAN packet in a sniff anchor point and the successful retransmission of the ACL packet within an $N_{sniff\ attempt}$ window of four slots in length. Because of a high frequency of occurrences "NF" of flushed ACL voice packets, the programmed process of FIG. 9 increases the duration of the $N_{sniff\ attempt}$ window. FIG. 10B is a timing diagram showing the successfully delayed retransmission of the ACL packet within an enlarged $N_{sniff\ attempt}$ window of eight slots in length.

Any additional Synchronous Connection-Oriented (SCO) or Extended Synchronous Connection-Oriented (eSCO) packets that may be transmitted between the terminal and the headset have priority over both original and retransmitted ACL packets. In stereo headsets, for example, the ACL packets can carry one audio channel and the synchronous packets can carry the other audio channel. In video/phone or virtual reality headsets, for example, the ACL packets can carry the audio data and the synchronous packets can carry the compressed image data. If the synchronous SCO or eSCO packets are scheduled to be transmitted by the terminal during a sniff anchor point, the terminal aborts transmitting either the original or the retransmission Bluetooth ACL packet until an available slot occurs after the anchor point, which is not being used by SCO or eSCO packets. FIG. 10B is a timing diagram showing a rescheduling of a retransmission ACL packet with an eSCO packet in the slot following an anchor point, the diagram further showing the successfully delayed retransmission of the ACL packet within an enlarged $N_{sniff\ attempt}$ window of eight slots in length.

Figure 11:
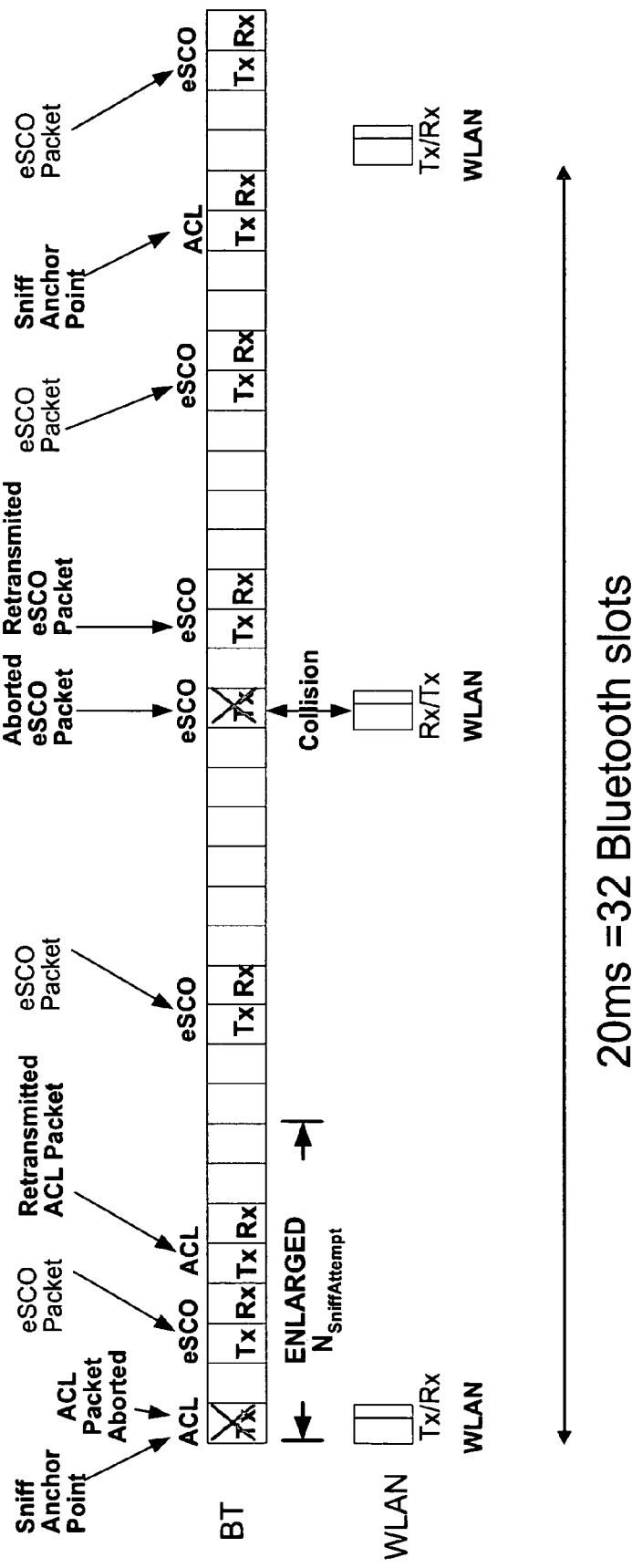
FIG. 11 is a timing diagram according to an embodiment of the present invention showing how the invention handles collisions between WLAN packets and ACL or eSCO packets exchanged between the headset and the terminal. The figure shows the collision of an original Bluetooth ACL packet with a WLAN packet in a sniff anchor point, a rescheduling of the retransmission ACL packet with an eSCO packet in the following slot, and the collision of an original eSCO packet with a WLAN packet.

Further in accordance with the invention, FIG. 11 is a timing diagram showing how the invention handles collisions between WLAN packets and ACL and eSCO packets exchanged between the headset and the terminal. The figure shows the collision of an original Bluetooth ACL packet with a WLAN packet in a sniff anchor point, a rescheduling of the retransmission ACL packet with an eSCO packet in the following slot, and the collision of an original eSCO packet with a WLAN packet. A higher transmission priority is assigned to the WLAN packets than to the synchronous eSCO packets when transmission or retransmission of the WLAN packets overlaps a first occurring transmission of the eSCO packets, to abort transmission of the first occurring eSCO packets. Thereafter, a higher transmission priority is assigned to the aborted eSCO packets than to the WLAN packets when transmission of the WLAN packets overlaps the retransmission of the aborted eSCO packets, to retransmit the aborted eSCO packets. The aborted WLAN packets are then retransmitted, as provided by existing WLAN standards.

When the terminal is setting up the links with the headset, the terminal can additionally set up an EV3-type eSCO link with headset, which enables the headset and terminal to exchange retransmissions of lost or damaged eSCO packets inside a retransmission window of size $W_{eSCO}$ slots. For example, the headset is configured to support the Bluetooth Hands Free Profile 1.2 with an eSCO repetition period of $T_{eSCO}=6$ slots and an eSCO window size of $W_{eSCO}=2$ slots using the EV3 packet format and CVSD compression encoding.

Figure 12:
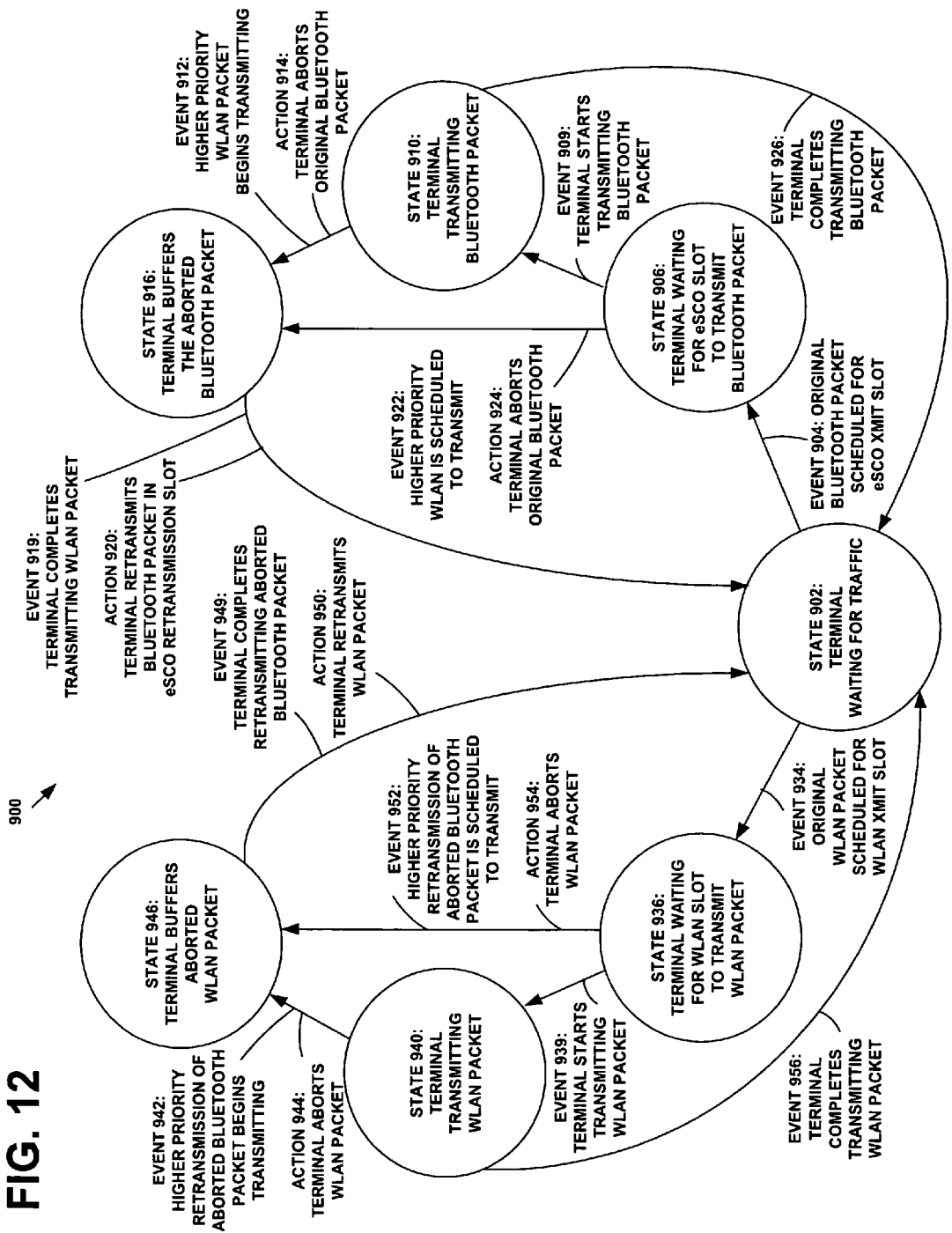
FIG. 12 is a state diagram according to an embodiment of the present invention showing the operating states established by the controller to assign a higher priority to the WLAN transmissions than to original eSCO packets and later to assign a higher priority to the eSCO packet retransmissions than to WLAN transmissions.

FIG. 12 is a state diagram showing the operating states established by the controller to assign a higher priority to the WLAN transmissions than to original eSCO packets and later to assign a higher priority to the eSCO packet retransmissions than to WLAN transmissions. The invention provides a new mode of operation for the control module or controller 610 shown in FIG. 6, between the WLAN transceiver 602 and the Bluetooth transceiver 604 in the terminal 100A, which assigns a higher priority to WLAN transmissions than to original Bluetooth eSCO transmissions, i.e., a first attempt at transmitting a Bluetooth eSCO packet. The control module 610 selects which one of those transceivers is to be operating at a particular instant. The invention uses the Extended Synchronous Connection-Oriented (eSCO) logical transport in the Bluetooth v1.2 Specification, as shown in FIG. 11. FIG. 11 shows the packet prioritization during the Bluetooth eSCO connection. The WLAN transmissions have a higher priority during normal Bluetooth eSCO slots and the eSCO retransmissions have a higher priority during eSCO retransmission slots. The invention exploits the retransmission window feature in the eSCO logical transport that is available after the reserved slots. EV packets used on the synchronous eSCO logical transport include retransmission of aborted packets within the retransmission window if the transmission of the last prior Bluetooth eSCO packet has been interrupted by a higher priority transmission of WLAN packets. The control module 610 assigns to the aborted Bluetooth eSCO packet a higher priority for its retransmission over the WLAN packets, to assure retransmission of the aborted Bluetooth eSCO packet. FIG. 5 shows the Bluetooth EV3 eSCO packet usage. Bluetooth eSCO packets that were interrupted in a prior occurring normal slot are assigned a higher priority than WLAN packets and are retransmitted in the following Bluetooth eSCO retransmission window.

The state diagram 900 of FIG. 12 shows the operating states established by the control module 610 to assign a higher priority to the WLAN transmissions during normal Bluetooth eSCO slots and assign a higher priority to the Bluetooth eSCO retransmissions during Bluetooth eSCO retransmission slots. The state diagram 900 for terminal 100A begins in the quiescent State 902: where the terminal is waiting for traffic. In State 902, if Event 904 occurs where an original Bluetooth eSCO packet is scheduled for an eSCO transmission slot, then the state transitions to State 906 where the terminal is waiting for the eSCO slot to begin to enable transmitting the Bluetooth eSCO packet. In State 906, if Event 909 occurs where the terminal starts transmitting the Bluetooth eSCO packet, then the state transitions to State 910 where the terminal is actively transmitting the Bluetooth eSCO packet. In State 910, if Event 912 occurs where a higher priority WLAN packet begins transmitting, then Action 914 is taken where the terminal aborts transmitting the original Bluetooth eSCO packet and the state transitions to State 916 where the terminal buffers the aborted Bluetooth eSCO packet. In State 916, if Event 919 occurs where the terminal completes transmitting the WLAN packet, then the Action 920 is taken where the terminal retransmits the aborted Bluetooth eSCO packet in an eSCO retransmission slot and the state transitions back to the quiescent State 902 where the terminal is waiting for traffic. There is a second possible event that can occur in State 906. In State 906, if Event 922 occurs where a higher priority WLAN packet is scheduled to transmit, then Action 924 is taken where the terminal aborts the original Bluetooth eSCO packet and the state transitions to State 916. There is a second possible event that can occur in State 910. In State 910, if Event 926 occurs where terminal completes transmitting the Bluetooth eSCO packet, then the state transitions back to the quiescent State 902: where the terminal is waiting for traffic.

In State 902 of FIG. 12, if Event 934 occurs where an original WLAN packet is scheduled for a WLAN transmit slot, then the state transitions to State 936 where the terminal is waiting for the WLAN slot to begin to enable transmitting the WLAN packet. In State 936, if Event 939 occurs where the terminal starts transmitting the WLAN packet, then the state transitions to State 940 where the terminal is actively transmitting the WLAN packet. In State 940, if Event 942 occurs where a higher priority retransmission begins of an aborted Bluetooth eSCO packet, then Action 944 is taken where the terminal aborts the WLAN packet and the state transitions to State 946 where the terminal buffers the aborted WLAN packet. In State 946, if Event 949 occurs where the terminal completes retransmitting the aborted Bluetooth eSCO packet, then Action 950 is taken where the terminal retransmits the aborted WLAN packet and the state transitions back to the quiescent State 902 where the terminal is waiting for traffic. There is a second possible event that can occur in State 936. In State 936, if Event 952 occurs where a higher priority retransmission of an aborted Bluetooth eSCO packet is scheduled to transmit, the Action 954 is taken where the terminal aborts the WLAN packet and transitions to State 946. There is a second possible event that can occur in State 940. In State 940, if Event 956 occurs where the terminal completes transmitting the WLAN packet, then the state transitions back to the quiescent State 902 where the terminal is waiting for traffic.

Further in accordance with the invention, after the headset connection 106A has been established, the terminal 100A will perform a role switch, if needed to assume the master role. As the master device, the terminal 100A will set up an EV3-type eSCO link with headset 101A, which enables the headset 101A to use the eSCO retransmission feature.

After an ACL link has been established by the terminal 100A, one or more eSCO links can be optionally set up to the headset 101A. The eSCO links are similar to SCO links using timing control flags and an interval of $T_{eSCO}$ slots in duration. The eSCO link with the headset is optionally set up to provide limited eSCO retransmissions of lost or damaged packets inside the retransmission window of size $W_{eSCO}$ slots. (For example, the headset can optionally be configured to support the Hands Free Profile 1.2 with an eSCO repetition period of $T_{eSCO}=6$ slots and an eSCO window size of $W_{eSCO}=2$ slots using the EV3 packet format and CVSD compression encoding.)

During operation of the invention, the WLAN traffic is assigned a higher priority than the Bluetooth eSCO traffic so that the first-time transmission of a eSCO packet is suppressed or interrupted when a WLAN packet is simultaneously either being received or transmitted. To assure that the suppressed or interrupted Bluetooth eSCO packet is eventually retransmitted successfully, the eSCO retransmission packet is assigned a higher priority than the WLAN traffic. Any WLAN packet known to have started transmission during the retransmission of a Bluetooth eSCO packet is interrupted. The existing WLAN protocol will later retransmit the interrupted WLAN packet. In effect, collision with WLAN traffic can be reduced by scheduling the Bluetooth eSCO transmission later, if necessary. In this manner WLAN packet retransmissions are used less often than in the prior art, thus imposing less of an encumbrance on the WLAN traffic.

FIG. 6 shows the WLAN telephone terminal 100A with the control module 610 that coordinates the operation of the Bluetooth transceiver 604, the WLAN transceiver 602, and the antenna switch 620 that selectively connects one or the other transceiver to the antenna 105A. The memory 630 in the terminal 100A of FIG. 6 stores program code to implement the state diagram 800 of FIG. 8A and the state diagram 900 of FIG. 12. FIG. 8A is the state diagram 800 showing the operating states programmed into the control module 610 to assign a higher priority to WLAN packet traffic when it collides with original Bluetooth ACL packet traffic during a sniff anchor point and to assign a higher priority to the terminal's retransmission of aborted Bluetooth ACL packets and the headset's response ACL packets in available Bluetooth slots following the anchor point. FIG. 12 is the state diagram 900 showing the operating states programmed into the control module 610 to assign a higher priority to the WLAN transmissions during normal eSCO slots and assign a higher priority to the eSCO retransmissions during eSCO retransmission slots. eSCO packets that were aborted because they were scheduled to begin when an existing WLAN transmission was occurring or that were aborted because they were interrupted by a WLAN transmission in a prior occurring normal eSCO slot are assigned a higher priority by the control module 610 for retransmission and are retransmitted in the following eSCO retransmission slots.

In handling collisions of eSCO packets with WLAN packets, the WLAN transceiver 602 in FIG. 6 signals to the control module 610 with the WX signal when it is scheduled to transmit or is transmitting WLAN packets. The Bluetooth transceiver 604 signals to the control module 610 with the STATUS signal whether it has an aborted eSCO packet ready for retransmission. The control module 610 signals to the Bluetooth transceiver 604 with the TX_CONFX signal if it is to abort any transmission of an original eSCO packet. The control module 610 signals to the WLAN transceiver 602 with the BREX signal if it is to abort any scheduled WLAN packet transmission or abort transmitting any WLAN packets. The Bluetooth transceiver 604 also signals to the control module 610 with the RF_ACTIVE signal whether it is transmitting a eSCO packet. The Bluetooth transceiver 604 in FIG. 6 signals to the control module 610 with the FREQ signal to provide its timing. The WLAN transceiver 602 signals to the control module 610 with the WFQ signal to provide its timing. The signals are controlled by execution of the program code in memory 630 in accordance with the state diagram 800 of FIG. 8A and the state diagram 900 of FIG. 12.

If the STATUS signal is low, then there is no aborted eSCO packet ready for retransmission. In response to when the WLAN transceiver 602 signals to the control module 610 with the WX signal that it is scheduled to transmit or is transmitting WLAN packets in combination with the STATUS signal being low, indicating that there is no aborted eSCO packet ready for retransmission, the control module 610 raises the TX_CONFX signal to the Bluetooth transceiver 604 causing it to abort any transmission of an original eSCO packet. This is shown in the state diagram of FIG. 12.

If the STATUS signal is high, indicating that there is an aborted eSCO packet ready for retransmission, then in response the control module 610 signals to the WLAN transceiver 602 with the BREX signal to abort any scheduled WLAN packet transmission or abort transmitting any WLAN packets. This enables the Bluetooth transceiver 604 to retransmit the aborted eSCO packet. This is shown in the state diagram of FIG. 12.

The control module 610, the WLAN transceiver 602, and the Bluetooth transceiver 604 in the terminal 100A of FIG. 6 can be a set of LSI circuit chips. The control module 610 can be implemented as a programmed microcontroller chip that contains all the components comprising a controller, including a CPU, RAM, some form of ROM to store program code instructions, I/O ports, and timers. The control module 610 can also be implemented as an Application-Specific Integrated Circuit (ASIC). Alternately, the control module 610 circuitry can be integrated into the LSI circuit chip of the Bluetooth transceiver 604 or integrated into the LSI circuit chip of the WLAN transceiver 602. The memory 630 in the terminal 100A of FIG. 6 stores program code to implement the state diagram 800 of FIG. 8A and the state diagram 900 of FIG. 12. Portions of this program code can also be stored in the respective control module 610, the WLAN transceiver 602, and/or the Bluetooth transceiver 604. The program code can have been originally stored on a physical recording medium, such as a CD ROM disk, and then copied from the disk and written into the memory 630. Alternately, the program code can have been originally downloaded from a communications network medium, such as the Internet, and then written into the memory 630. Alternately, the memory 630 can be a ROM and the program code can have been originally stored in the ROM by a manufacturer of components of the terminal.

From the headset 101A point of view, when the terminal 100A is in receive mode, the headset 10A can transmit the eSCO packet to the terminal 100A during an eSCO slot. If the headset 101A did not receive the previous eSCO packet from the terminal 100A in the scheduled master-to-slave slot because of a WLAN transmission by the terminal 100A, the headset 101A will recognize the omission and set the acknowledge indication ARQN bit='0' in its reply eSCO packet. Although the terminal 100A may not receive the reply eSCO packet because of the WLAN transmission, it does not matter because the terminal 100A knows that its last prior eSCO transmission was preempted and it will use the eSCO retransmission window to retransmit the aborted eSCO packet.

The control module 610, the WLAN transceiver 602, and the Bluetooth transceiver 604 of FIG. 6 can include programmed microcontroller chips that contain all the components comprising a controller, including a CPU processor, RAM storage, some form of ROM to store program code, I/O ports, and timers. The microcontroller chips are programmed to implement the state diagrams of FIG. 8A and of FIG. 12.

The Bluetooth transceiver 604 of FIG. 6 can include a programmed microcontroller chip that stores program code in its ROM or RAM for execution by its processor for operating the Bluetooth transceiver in the Bluetooth network. The WLAN transceiver 602 of FIG. 6 can include a programmed microcontroller chip that stores program code in its ROM or RAM for execution by its processor for operating the WLAN transceiver in the WLAN network.

The control module 610 of FIG. 6 can include a programmed microcontroller chip that stores program code in its ROM or RAM for execution by its processor. The program code implements the method of the invention, for example as represented by the state diagram of FIG. 8A and/or the state diagram of FIG. 12.

In an alternate embodiment of the invention, after the headset connection has been established by the terminal and it performs a role switch to assume the master role, the terminal will set up an EV5 eSCO link with headset. The EV5 packet type enables power consumption in the headset to be reduced because the packets are sent less frequently and the protocol-to-packet overhead is smaller. The parameters for the eSCO connection with EV5 packets are $T_{eSCO}$=32 slots and $W_{eSCO}$=2 using EV5 and CVSD voice coding.

The reason to select $T_{eSCO}$=32 slots is that with this value the EV5 eSCO packet is aligned at every 32 slots, which is the same time interval as the average interval of 20 ms for the VoIP WLAN packet. It should also be noted that with these parameters and the maximum EV5 packet data of 180 bytes, the average data rate is 72 kbps, which means that roughly every 12th packet does not have to be sent. Alternately, if a steady 64 kbps data rate is desired, a 160 byte payload can be used. This is not limited to any particular voice coding scheme, but can be used as long as the required data rate is below 72 kbps.

Although establishing the Bluetooth connection 106A with the terminal 100A as the master device is the preferred way to operate the invention, retaining the headset 101A in the role of the master device can also be used to establish the Bluetooth connection 106A. In this alternate embodiment, the terminal and headset are programmed so that the headset remains the master device in establishing the Bluetooth connection. As the master device, the headset will set up the ACL link and the EV3-type or EV5-type eSCO link with the terminal, which enables the headset and terminal to use the retransmission features described above.

In another alternate embodiment of the invention, the Enhanced Data Rate (EDR) Bluetooth packets can be used, as provided in the Bluetooth v2+EDR Specification. The EDR packets make it possible to increase the Bluetooth voice packet interval and thus to leave more time for WLAN packets to be transmitted. The EDR packets have the same retransmission control as described above for the Bluetooth v1.2 Specification eSCO packets and they have the advantage of transmitting at a data rate of from 2 Mbps to 3 Mbps. Both one-slot and three-slot EDR packets are available; the one-slot packet is preferred to keep latency to a minimum. The Bluetooth transceiver 604 in FIG. 6 signals to the control module 610 with the FREQ signal to provide its timing and to identify when it is transmitting Enhanced Data Rate (EDR) Bluetooth packets.

The resulting invention solves the problem of reducing interference in simultaneous WLAN and Bluetooth signal handling, especially in voice over IP communications via a WLAN to a Bluetooth headset. The resulting invention is particularly advantageous in areas of high WLAN traffic, such as in a business office, where frequent retransmission of interrupted WLAN packets would significantly impair WLAN traffic capacity. A further advantage of the invention is the ability of the terminal to predict the need to transmit Bluetooth packets because SCO and eSCO packets are transmitted at known fixed intervals. Another advantage of the invention is that it does not require a change to the WLAN standard, but merely a proprietary change to the Bluetooth side of the terminal and to the headset, since using the ACL link to carry voice data is not a standard feature in Bluetooth.

Although specific embodiments of the invention have been disclosed, a person skilled in the art will understand that changes can be made to the specific embodiments without departing from the spirit and scope of the invention. For example the wireless terminal 100A can exchange with the wireless access point 140A IEEE 802.11 protocol data units containing data for other types of I/O devices, such as a printer or a bar code scanner, for example. The wireless terminal 100A can exchange encoded data in Bluetooth eSCO or ACL packets with a wireless I/O device such as a Bluetooth-enabled printer or a Bluetooth-enabled bar code scanner, for example. Additionally, the wireless PAN 106A connecting the terminal 100A to the headset 101A can operate in either a radio frequency band, an infrared band, or an optical band.

What is claimed is:

1. A wireless terminal, comprising:
   a first transceiver operating in a wireless PAN network for communicating first data units in accordance with a first communications protocol and operating in a wireless communications band;
   a second transceiver operating in a wireless LAN network for communicating second data units in accordance with a second communications protocol and operating in a band substantially the same as said wireless communications band;
   said first transceiver establishing predefined slot times to listen for traffic for timing an assignment of relative priorities to the first data units and the second data units; and
   a controller coupled to said first and second transceivers, assigning a higher priority to said second data units if one of said second data units is sensed during one of said predefined slot times, to abort transmission of one of said first data units;
   said controller assigning a higher priority to said aborted first data unit than to said second data units if one of said second data units is sensed while attempting to retransmit said aborted first data unit in a slot following said one of said predetermined slots, to retransmit said aborted first data unit.

2. The wireless terminal of claim 1, further comprising:
   said first communications protocol is a Bluetooth standard and said first data units are Bluetooth ACL packets.

3. The wireless terminal of claim 1, further comprising:
   said wireless terminal exchanging voice over internet (VoIP) packets as said second data units with a wireless access point using IEEE 802.11 Wireless LAN Standard as said second communications protocol; and
   said wireless terminal exchanging encoded audio data in Bluetooth ACL packets as said first data units with a wireless headset using a Bluetooth standard as said first communications protocol.

4. The wireless terminal of claim 3, further comprising:
   said wireless terminal establishing a connection with said headset and performing a role switch to assume a master role to set up an ACL link with said headset in a sniff mode.

5. The wireless terminal of claim 3, further comprising:
   said ACL packets transporting voice data between the terminal and the headset having time-based characteristics that may be retransmitted until received or expired;
   said terminal being programmed to automatically flush aborted ACL voice packets after the packets have expired because of waiting too long for an available slot for retransmission;
   said terminal determining if a frequency of occurrence of flushed ACL voice packets is greater than a predetermined value; and
   said terminal increasing a duration of a listening window following said predefined slot times if said frequency of occurrence is greater than said predetermined value.

6. The wireless terminal of claim 1, further comprising:
   said wireless PAN band being selected from the group consisting of radio frequency band, infrared band, and optical band.

7. A method in a wireless terminal, comprising:
   operating a first transceiver in a wireless PAN network for communicating first data units in accordance with a first communications protocol and operating in a wireless communications band;
   operating a second transceiver in a wireless LAN network for communicating second data units in accordance with a second communications protocol and operating in a band substantially the same as said wireless communications band;
   establishing with said first transceiver predefined slot times to listen for traffic for timing an assignment of relative priorities to the first data units and the second data units;
   assigning a higher priority to said second data units if one of said second data units is sensed during one of said predefined slot times, to abort transmission of one of said first data units; and
   assigning a higher priority to said aborted first data unit than to said second data units if one of said second data units is sensed while attempting to retransmit said aborted first data unit in a slot following said one of said predetermined slots, to retransmit said aborted first data unit.

8. The method in a wireless terminal of claim 7, further comprising:
said first communications protocol is a Bluetooth standard and said first data units are Bluetooth ACL packets.

9. The method in a wireless terminal of claim 7, further comprising:
said wireless terminal exchanging voice over internet (VoIP) packets as said second data units with a wireless access point using IEEE 802.11 Wireless LAN Standard as said second communications protocol; and
said wireless terminal exchanging encoded audio data in Bluetooth ACL packets as said first data units with a wireless headset using a Bluetooth standard as said first communications protocol.

10. The method in a wireless terminal of claim 9, further comprising:
said wireless terminal establishing a connection with said headset and performing a role switch to assume a master role to set up an ACL link with said headset in a sniff mode.

11. The method in a wireless terminal of claim 9, further comprising:
transporting voice data in said ACL packets between the terminal and the headset having time-based characteristics that may be retransmitted until received or expired;
automatically flushing aborted ACL voice packets after the packets have expired because of waiting too long for an available slot for retransmission;
determining if a frequency of occurrence of flushed ACL voice packets is greater than a predetermined value; and
increasing a duration of a listening window following said predefined slot times if said frequency of occurrence is greater than said predetermined value.

12. The method in a wireless terminal of claim 7, further comprising:
said wireless PAN band being selected from the group consisting of radio frequency band, infrared band, and optical band.

13. A system, comprising:
a wireless terminal;
a wireless headset;
a first transceiver in said wireless terminal operating in a wireless PAN network for communicating first data units in accordance with a first communications protocol and operating in a wireless communications band to communicate with said wireless headset;
said first transceiver establishing predefined slot times to listen for traffic for timing an assignment of relative priorities to the first data units and the second data units;
a wireless access point;
a second transceiver in said wireless terminal operating in a wireless LAN network for communicating the second data units in accordance with a second communications protocol and operating in a band substantially the same as said wireless communications band to communicate with said wireless access point; and
a controller in said wireless terminal coupled to said first and second transceivers, assigning a higher priority to said second data units if one of said second data units is sensed during one of said predefined slot times, to abort transmission of one of said first data units;
said controller assigning a higher priority to said aborted first data unit than to said second data units if one of said second data units is sensed while attempting to retransmit said aborted first data unit in a slot following said one of said predetermined slots, to retransmit said aborted first data unit.

14. The system of claim 13, further comprising:
said first communications protocol is a Bluetooth standard and said first data units are Bluetooth ACL packets.

15. The system of claim 13, further comprising:
said wireless terminal exchanging voice over internet (VoIP) packets as said second data units with a wireless access point using IEEE 802.11 Wireless LAN Standard as said second communications protocol; and
said wireless terminal exchanging encoded audio data in Bluetooth ACL packets as said first data units with a wireless headset using a Bluetooth standard as said first communications protocol.

16. The system of claim 15, further comprising:
said wireless terminal establishing a connection with said headset and performing a role switch to assume a master role to set up an ACL link with said headset in a sniff mode.

17. The system of claim 15, further comprising:
said ACL packets transporting voice data between the terminal and the headset having time-based characteristics that may be retransmitted until received or expired;
said terminal being programmed to automatically flush aborted ACL voice packets after the packets have expired because of waiting too long for an available slot for retransmission;
said terminal determining if a frequency of occurrence of flushed ACL voice packets is greater than a predetermined value; and
said terminal increasing a duration of a listening window following said predefined slot times if said frequency of occurrence is greater than said predetermined value.

18. The system of claim 13, further comprising:
said wireless PAN band being selected from the group consisting of radio frequency band, infrared band, and optical band.

19. A chipset for a wireless terminal, comprising:
a first transceiver circuit chip operating in a wireless PAN network for communicating first data units in accordance with a first communications protocol and operating in a wireless communications band;
a second transceiver circuit chip operating in a wireless LAN network for communicating second data units in accordance with a second communications protocol and operating in a band substantially the same as said wireless communications band;
said first transceiver establishing predefined slot times to listen for traffic for timing an assignment of relative priorities to the first data units and the second data units; and
a controller circuit chip coupled to said first and second transceivers, assigning a higher priority to said second data units if one of said second data units is sensed during one of said predefined slot times, to abort transmission of one of said first data units;
said controller assigning a higher priority to said aborted first data unit than to said second data units if one of said second data units is sensed while attempting to retransmit said aborted first data unit in a slot following said one of said predetermined slots, to retransmit said aborted first data unit.

20. The chipset for a wireless terminal of claim 19, further comprising:
said first communications protocol is a Bluetooth standard and said first data units are Bluetooth ACL packets.

21. The chipset for a wireless terminal of claim 19, further comprising:
said wireless terminal exchanging voice over internet (VoIP) packets as said second data units with a wireless access point using IEEE 802.11 Wireless LAN Standard as said second communications protocol; and
said wireless terminal exchanging encoded audio data in Bluetooth ACL packets as said first data units with a wireless headset using a Bluetooth standard as said first communications protocol.

22. The chipset for a wireless terminal of claim 21, further comprising:
said wireless terminal establishing a connection with said headset and performing a role switch to assume a master role to set up an ACL link with said headset in a sniff mode.

23. The chipset for a wireless terminal of claim 21, further comprising:
said ACL packets transporting voice data between the terminal and the headset having time-based characteristics that may be retransmitted until received or expired;
said terminal being programmed to automatically flush aborted ACL voice packets after the packets have expired because of waiting too long for an available slot for retransmission;
said terminal determining if a frequency of occurrence of flushed ACL voice packets is greater than a predetermined value; and
said terminal increasing a duration of a listening window following said predefined slot times if said frequency of occurrence is greater than said predetermined value.

24. The chipset for a wireless terminal of claim 19, further comprising:
said wireless PAN band being selected from the group consisting of radio frequency band, infrared band, and optical band.

25. A program product for a wireless terminal, comprising:
a computer-readable medium;
program code encoded on the computer-readable medium, for execution in a wireless terminal for operating a first transceiver in a wireless PAN network for communicating first data units in accordance with a first communications protocol and operating in a wireless communications band;
program code encoded on the computer-readable medium, for execution in a wireless terminal for operating a second transceiver in a wireless LAN network for communicating second data units in accordance with a second communications protocol and operating in a band substantially the same as said wireless communications band;
program code encoded on the computer-readable medium, for execution in a wireless terminal for establishing with said first transceiver predefined slot times to listen for traffic for timing an assignment of relative priorities to the first data units and the second data units;
program code encoded on the computer-readable medium, for execution in a wireless terminal for assigning a higher priority to said second data units if one of said second data units is sensed during one of said predefined slot times, to abort transmission of one of said first data units; and
program code encoded on the computer-readable medium, for execution in a wireless terminal for assigning a higher priority to said aborted first data unit than to said second data units if one of said second data units is sensed while attempting to retransmit said aborted first data unit in a slot following said one of said predetermined slots, to retransmit said aborted first data unit.

26. The program product for a wireless terminal of claim 25, further comprising:
said first communications protocol is a Bluetooth standard and said first data units are Bluetooth ACL packets.

27. The program product for a wireless terminal of claim 25, further comprising:
said wireless terminal exchanging voice over internet (VoIP) packets as said second data units with a wireless access point using IEEE 802.11 Wireless LAN Standard as said second communications protocol; and
said wireless terminal exchanging encoded audio data in Bluetooth ACL packets as said first data units with a wireless headset using a Bluetooth standard as said first communications protocol.

28. The program product for a wireless terminal of claim 27, further comprising:
said wireless terminal establishing a connection with said headset and performing a role switch to assume a master role to set up an ACL link with said headset in a sniff mode.

29. The program product for a wireless terminal of claim 27, further comprising:
program code encoded on the computer-readable medium, for execution in a wireless terminal for transporting voice data in said ACL packets between the terminal and the headset having time-based characteristics that may be retransmitted until received or expired;
program code encoded on the computer-readable medium, for execution in a wireless terminal for automatically flushing aborted ACL voice packets after the packets have expired because of waiting too long for an available slot for retransmission;
program code encoded on the computer-readable medium, for execution in a wireless terminal for determining if a frequency of occurrence of flushed ACL voice packets is greater than a predetermined value; and
program code encoded on the computer-readable medium for execution in a wireless terminal for increasing a duration of a listening window following said predefined slot times if said frequency of occurrence is greater than said predetermined value.

30. The program product for a wireless terminal of claim 25, further comprising:
said wireless PAN band being selected from the group consisting of radio frequency band, infrared band, and optical band.

31. A program product for a wireless terminal, including program code encoded on a computer-readable medium, which, when executed, performs the steps comprising:
operating a first transceiver in a wireless PAN network for communicating first data units in accordance with a first communications protocol and operating in a wireless communications band;
operating a second transceiver in a wireless LAN network for communicating second data units in accordance with a second communications protocol and operating in a band substantially the same as said wireless communications band;
establishing with said first transceiver predefined slot times to listen for traffic for timing an assignment of relative priorities to the first data units and the second data units;

assigning a higher priority to said second data units if one of said second data units is sensed during one of said predefined slot times, to abort transmission of one of said first data units; and assigning a higher priority to said aborted first data unit than to said second data units if one of said second data units is sensed while attempting to retransmit said aborted first data unit in a slot following said one of said predetermined slots, to retransmit said aborted first data unit.

32. The program product for a wireless terminal of claim 31, further comprising:

said first communications protocol is a Bluetooth standard and said first data units are Bluetooth ACL packets.

33. The program product for a wireless terminal of claim 31, further comprising:

said wireless terminal exchanging voice over internet (VoIP) packets as said second data units with a wireless access point using IEEE 802.11 Wireless LAN Standard as said second communications protocol; and said wireless terminal exchanging encoded audio data in Bluetooth ACL packets as said first data units with a wireless headset using a Bluetooth standard as said first communications protocol.

34. The program product for a wireless terminal of claim 33, further comprising:

said wireless terminal establishing a connection with said headset and performing a role switch to assume a master role to set up an ACL link with said headset in a sniff mode.

35. The program product for a wireless terminal of claim 33, including program code which, when executed, performs the steps further comprising:

transporting voice data in said ACL packets between the terminal and the headset having time-based characteristics that may be retransmitted until received or expired;

automatically flushing aborted ACL voice packets after the packets have expired because of waiting too long for an available slot for retransmission;

determining if a frequency of occurrence of flushed ACL voice packets is greater than a predetermined value; and increasing a duration of a listening window following said predefined slot times if said frequency of occurrence is greater than said predetermined value.

36. The program product for a wireless terminal of claim 31, further comprising:

said wireless PAN band being selected from the group consisting of radio frequency band, infrared band, and optical band.

* * * * *